United States Patent
Thakare et al.

(10) Patent No.: US 12,020,707 B2
(45) Date of Patent: Jun. 25, 2024

(54) RESPONSE ORCHESTRATOR FOR NATURAL LANGUAGE INTERFACE

(71) Applicant: Amazon Technologies, Inc., Seattle, WA (US)

(72) Inventors: Prashant Jayaram Thakare, Sammamish, WA (US); Karthik Parameswaran, Milpitas, CA (US); Deepak Uttam Shah, Milpitas, CA (US); Prathyusha Nadella, Milpitas, CA (US); Janita Shah, Sunnyvale, CA (US); Venkat Chakravarthy, San Jose, CA (US); Michael Trinh, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/330,738

(22) Filed: Jun. 7, 2023

(65) Prior Publication Data

US 2023/0360650 A1   Nov. 9, 2023

Related U.S. Application Data

(63) Continuation of application No. 17/739,590, filed on May 9, 2022, now Pat. No. 11,769,506.

(51) Int. Cl.
*G10L 15/22* (2006.01)
*G10L 15/08* (2006.01)
(Continued)

(52) U.S. Cl.
CPC .............. *G10L 15/22* (2013.01); *G10L 15/18* (2013.01); *G10L 15/30* (2013.01); *G10L 2015/088* (2013.01); *G10L 2015/223* (2013.01)

(58) Field of Classification Search
USPC .............................. 704/257, 255; 707/1–507
See application file for complete search history.

(56) References Cited

U.S. PATENT DOCUMENTS

| 9,986,394 B1 * | 5/2018 | Taylor | ..................... H04W 4/18 |
| 10,074,371 B1 * | 9/2018 | Wang | ..................... G10L 15/08 |

(Continued)

FOREIGN PATENT DOCUMENTS

| AU | 2020267490 A1 * | 12/2021 | ........... G05B 13/028 |
| CN | 110073301 A * | 7/2019 | ............... A01B 3/02 |

(Continued)

*Primary Examiner* — Marcus T Riley
(74) *Attorney, Agent, or Firm* — Pierce Atwood LLP

(57) ABSTRACT

Techniques for providing device functionalities using device components are described. A system receives a system-generated directive from a skill system and determines a workflow to execute. The system implements a response orchestrator that operates based on the workflow that includes interception points where cross-cutting functionalities can be invoked as pluggable components. The interception points occur pre-system-generated directive, pre-device-facing directive, post-device-facing directive generation, post-device-facing directive dispatch, and the like. The system supports asynchronous execution, conditional execution, and sequential execution of components. Data determined by the cross functionality components can be used by other components for processing.

20 Claims, 12 Drawing Sheets

(51) Int. Cl.
*G10L 15/18* (2013.01)
*G10L 15/30* (2013.01)

(56) References Cited

U.S. PATENT DOCUMENTS

| | | | | |
|---|---|---|---|---|
| 10,079,015 | B1* | 9/2018 | Lockhart | G10L 15/02 |
| 10,475,445 | B1* | 11/2019 | Meyers | G10L 15/04 |
| 10,706,845 | B1* | 7/2020 | Devaraj | G06F 3/0482 |
| 11,024,303 | B1* | 6/2021 | Devaraj | G10L 15/1815 |
| 11,145,301 | B1* | 10/2021 | Rao | H04M 3/42374 |
| 11,146,522 | B1* | 10/2021 | Rao | H04L 51/066 |
| 11,175,880 | B2* | 11/2021 | Liu | G10L 15/22 |
| 11,195,522 | B1* | 12/2021 | Makashir | G10L 15/1815 |
| 11,380,322 | B2* | 7/2022 | Lang | G06F 3/165 |
| 11,501,794 | B1* | 11/2022 | Kim | G10L 15/1815 |
| 11,582,157 | B2* | 2/2023 | Hughes | H04L 41/40 |
| 11,605,387 | B1* | 3/2023 | Muralitharan | G10L 15/22 |
| 11,769,506 | B1* | 9/2023 | Thakare | G10L 15/22 704/257 |
| 11,797,263 | B2* | 10/2023 | Liu | G06F 3/165 |
| 2009/0271409 | A1* | 10/2009 | Ghosh | G06Q 10/10 707/999.009 |
| 2013/0086594 | A1* | 4/2013 | Cottrell | H04L 61/35 719/318 |
| 2016/0156774 | A1* | 6/2016 | Campbell | H04M 1/72403 455/418 |
| 2018/0061402 | A1* | 3/2018 | Devaraj | G10L 15/22 |
| 2018/0349482 | A1* | 12/2018 | Oliner | G06F 16/38 |
| 2019/0179611 | A1* | 6/2019 | Wojogbe | H04R 3/04 |
| 2019/0347063 | A1* | 11/2019 | Liu | G10L 15/22 |
| 2020/0053612 | A1* | 2/2020 | Jorgovanovic | H04W 76/15 |
| 2021/0090555 | A1* | 3/2021 | Mahmood | G10L 13/033 |
| 2021/0090572 | A1* | 3/2021 | Mahmood | G06F 3/167 |
| 2021/0090575 | A1* | 3/2021 | Mahmood | G10L 17/10 |
| 2021/0295833 | A1* | 9/2021 | Rastrow | G10L 15/1815 |
| 2022/0101112 | A1* | 3/2022 | Brown | G10L 15/18 |
| 2022/0108417 | A1* | 4/2022 | Liu | G06T 1/0007 |
| 2022/0121418 | A1* | 4/2022 | Liu | G10L 15/22 |
| 2022/0180867 | A1* | 6/2022 | Bobbili | G10L 15/22 |
| 2023/0267285 | A1* | 8/2023 | Wu | G06F 40/166 704/2 |
| 2023/0282218 | A1* | 9/2023 | Moynihan | G06F 16/40 704/235 |
| 2023/0360650 | A1* | 11/2023 | Thakare | G10L 15/22 |

FOREIGN PATENT DOCUMENTS

| | | | | |
|---|---|---|---|---|
| CN | 209085657 U | * | 7/2019 | B62D 15/0215 |
| CN | 112703457 A | * | 4/2021 | B62D 15/0215 |
| CN | 114514756 A | * | 5/2022 | G06N 20/00 |
| DE | 112021002631 T5 | * | 3/2023 | G06N 3/045 |
| EP | 3978949 A2 | * | 4/2022 | G01S 13/003 |
| GB | 2600550 A | * | 5/2022 | G06K 9/6256 |
| WO | WO-2020227429 A1 | * | 11/2020 | G05B 13/028 |
| WO | WO-2022072507 A1 | * | 4/2022 | G06N 3/045 |

\* cited by examiner

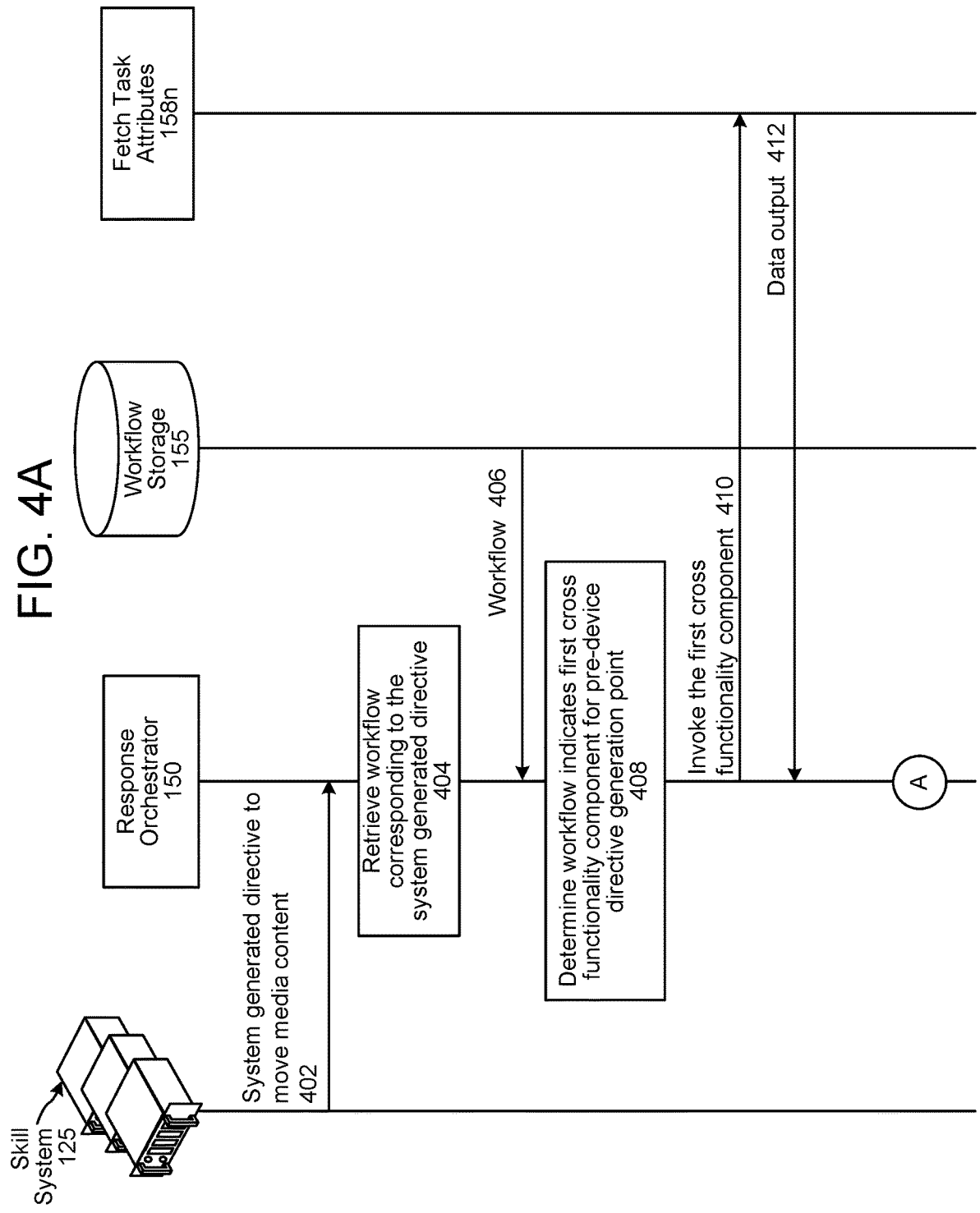

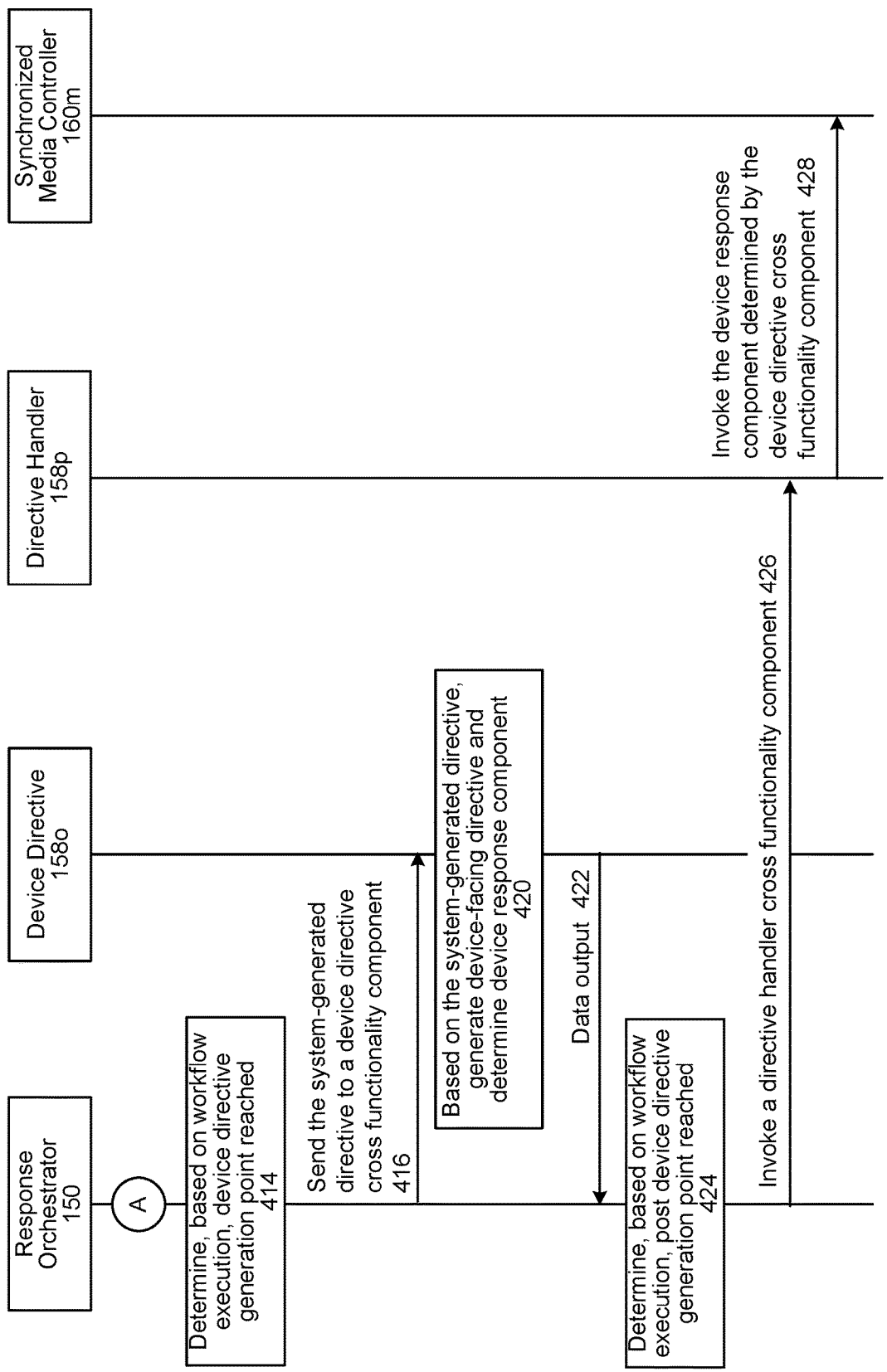

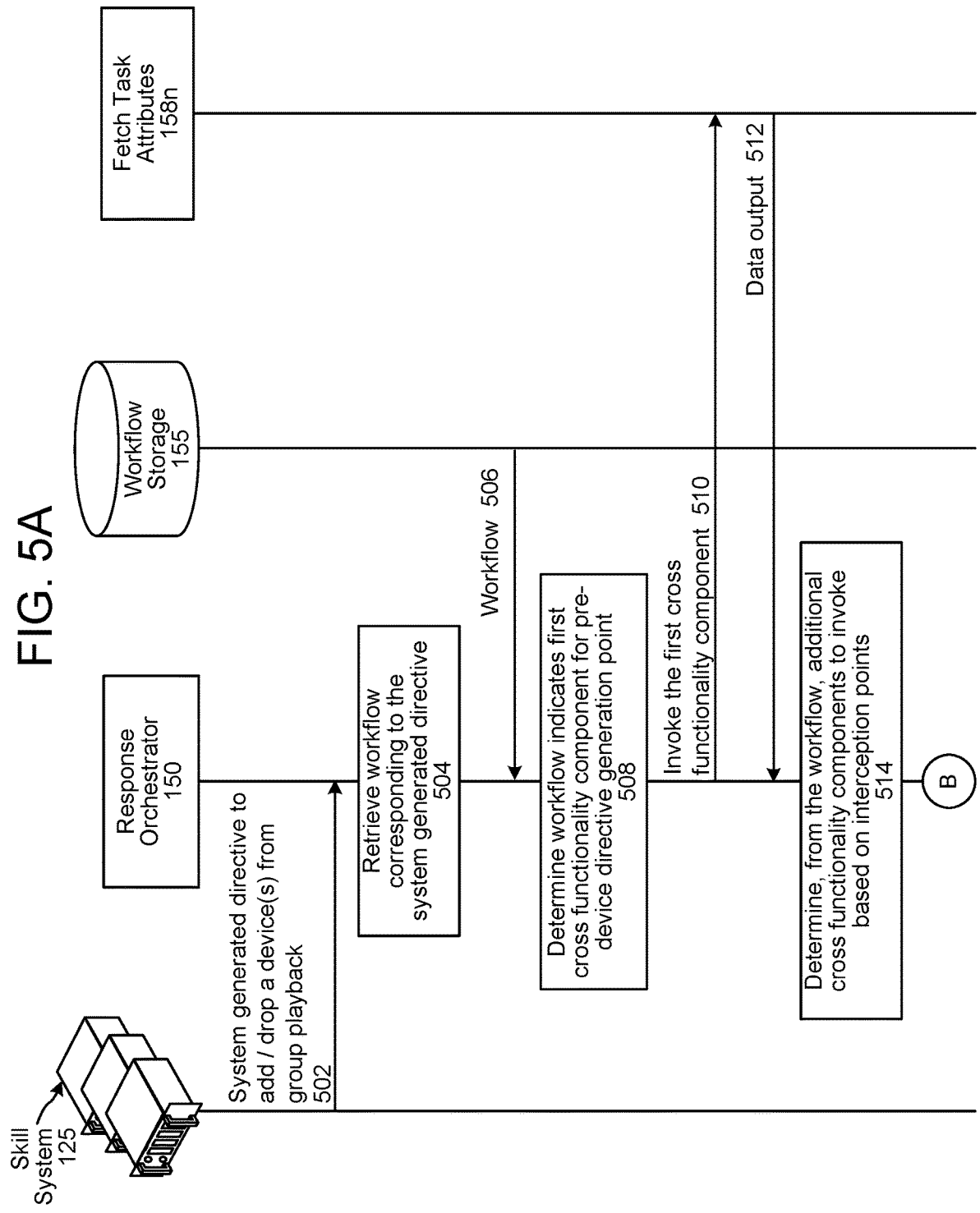

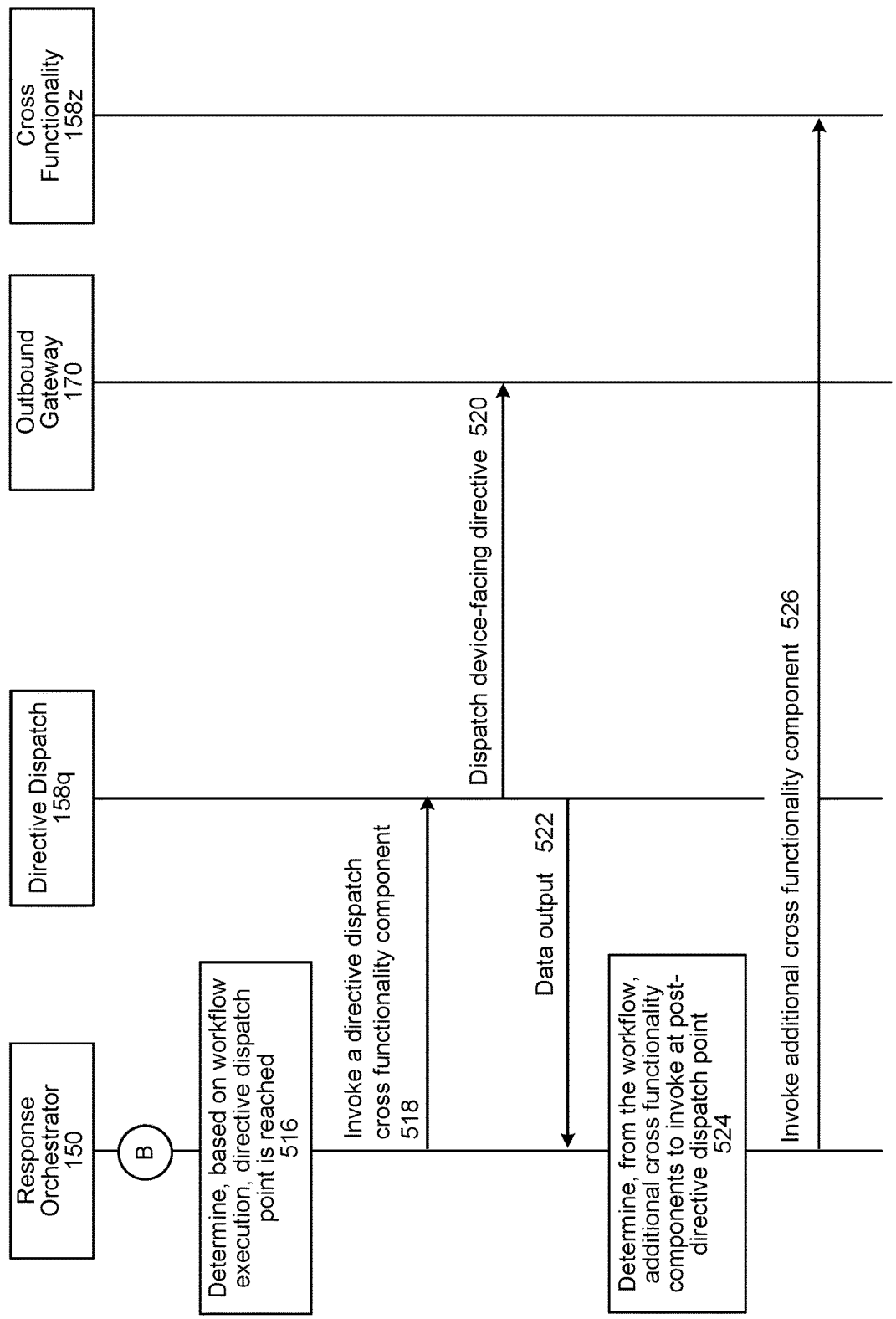

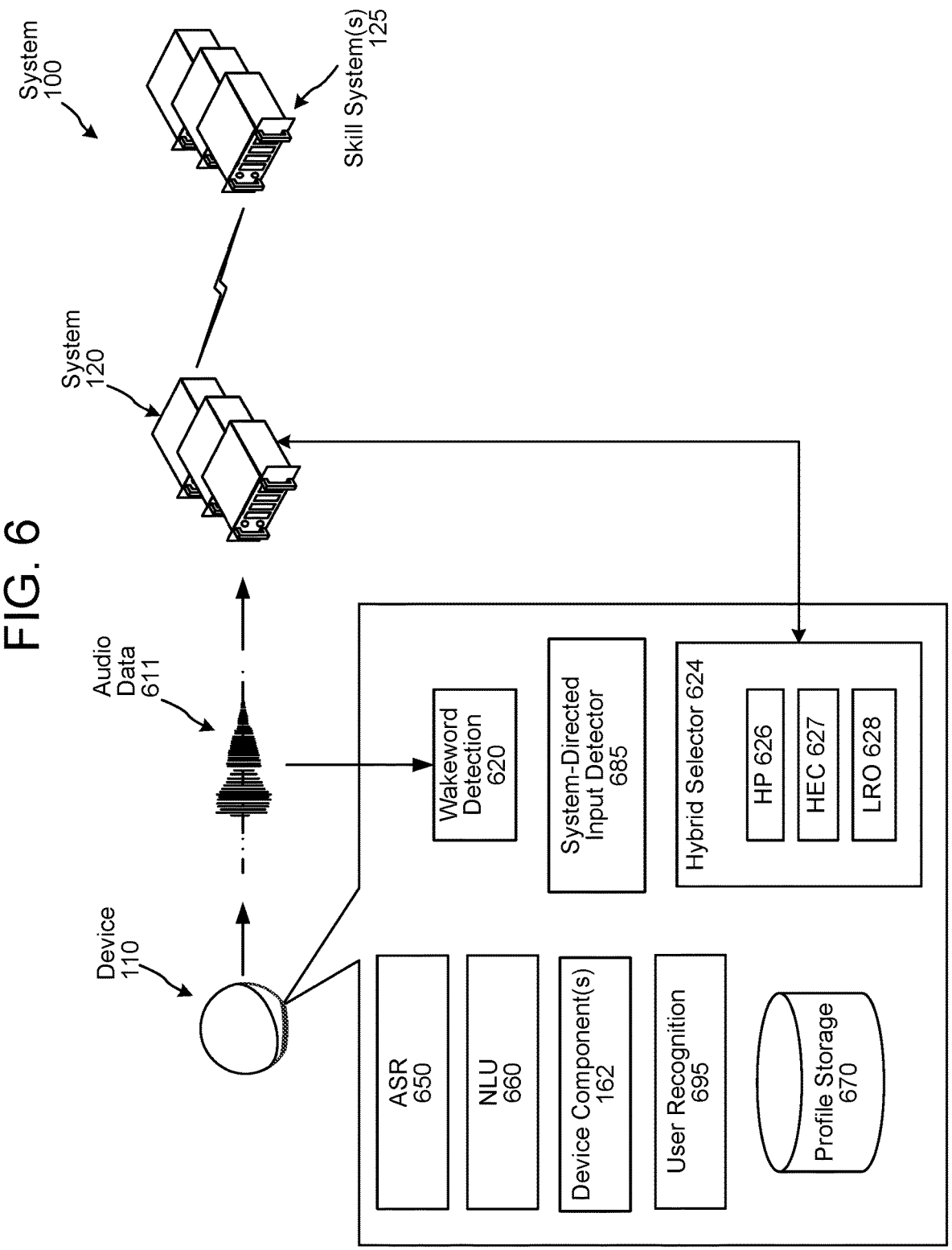

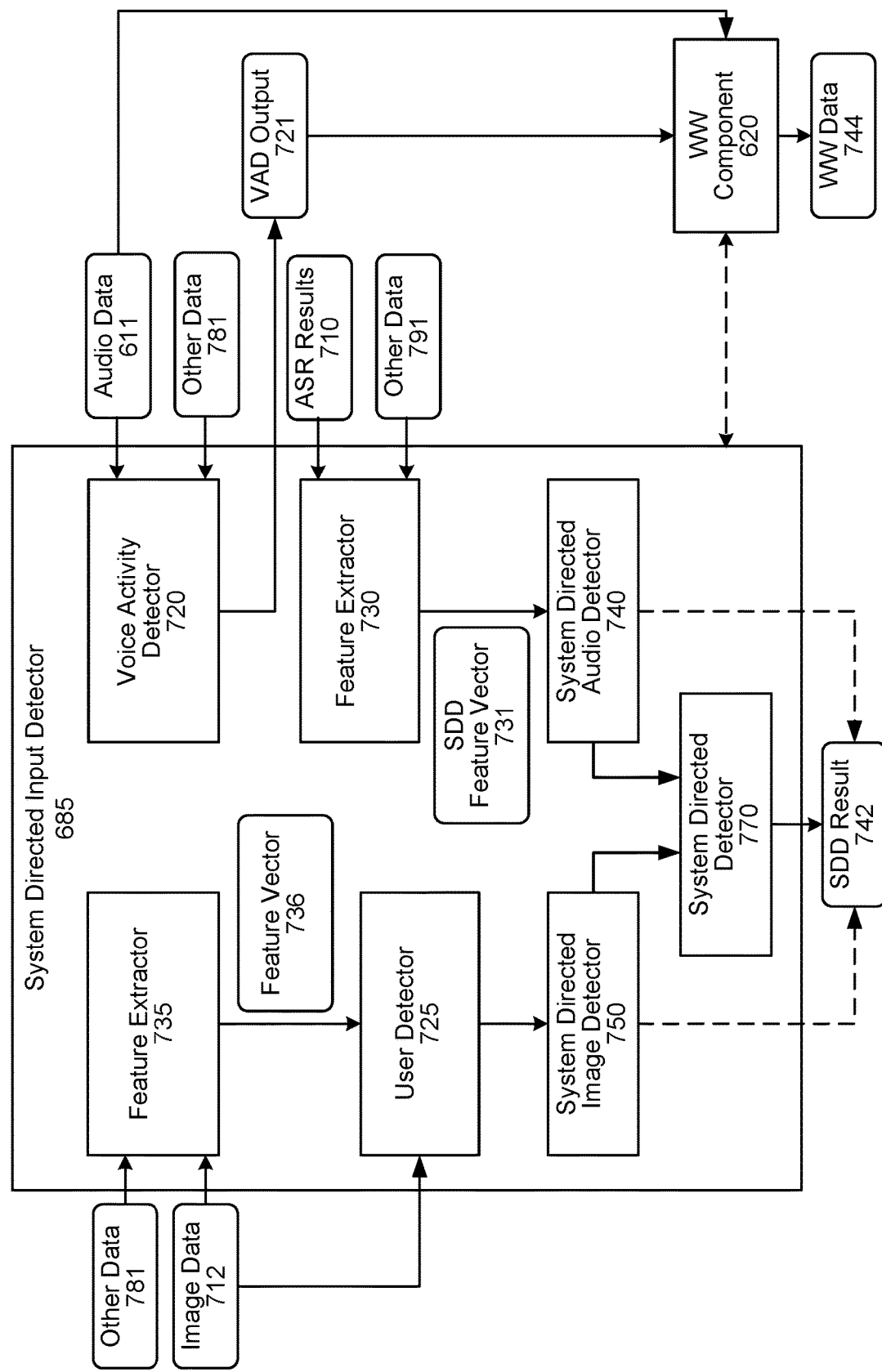

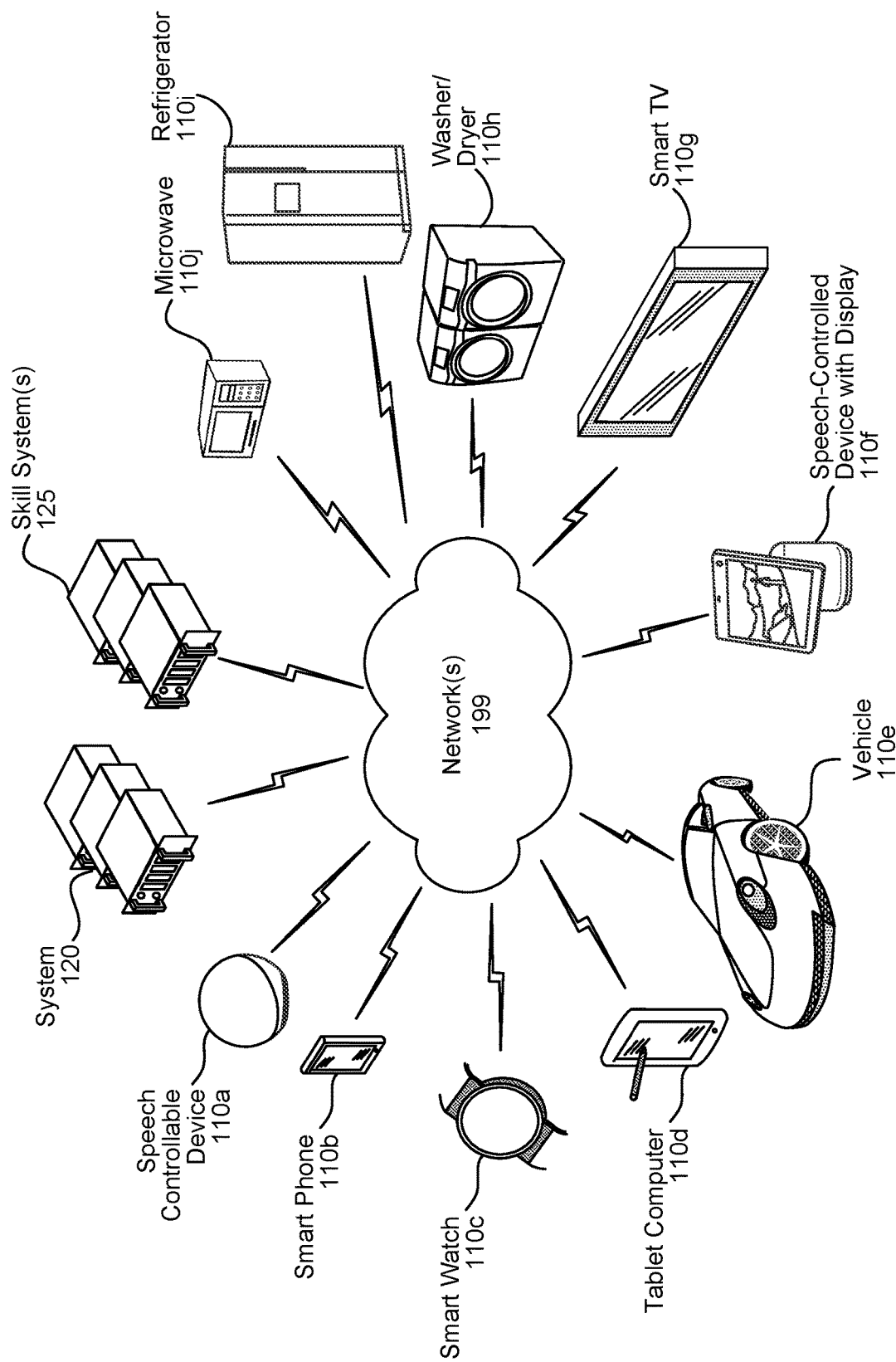

RESPONSE ORCHESTRATOR FOR NATURAL LANGUAGE INTERFACE

CROSS-REFERENCE TO RELATED APPLICATIONS

This application is a continuation of, and claims the benefit of priority of, U.S. Non-Provisional application Ser. No. 17/739,590, filed May 9, 2022, titled "RESPONSE ORCHESTRATOR FOR NATURAL LANGUAGE INTERFACE." The content of the above application is hereby incorporated by reference in its entirety.

BACKGROUND

Natural language processing systems have progressed to the point where humans can interact with computing devices using their voices and natural language textual input. Such systems employ techniques to identify the words spoken and written by a human user based on the various qualities of received input data. Speech recognition combined with natural language understanding processing techniques enable speech-based user control of computing devices to perform tasks based on the user's spoken inputs. Speech recognition and natural language understanding processing techniques may be referred to collectively or separately herein as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 4A-4B are a signal flow diagram illustrating how a media move request may be processed, according to embodiments of the present disclosure.

FIGS. 5A-5B are a signal flow diagram illustrating how a request to update group playback may be processed, according to embodiments of the present disclosure.

FIG. 6 is a conceptual diagram of components of a device, according to embodiments of the present disclosure.

FIG. 7 is a conceptual diagram of components of a system to detect if input audio data includes system directed speech, according to embodiments of the present disclosure.

FIG. 10 illustrates an example of a computer network for use with the overall system, according to embodiments of the present disclosure.

DETAILED DESCRIPTION

Figure 1:
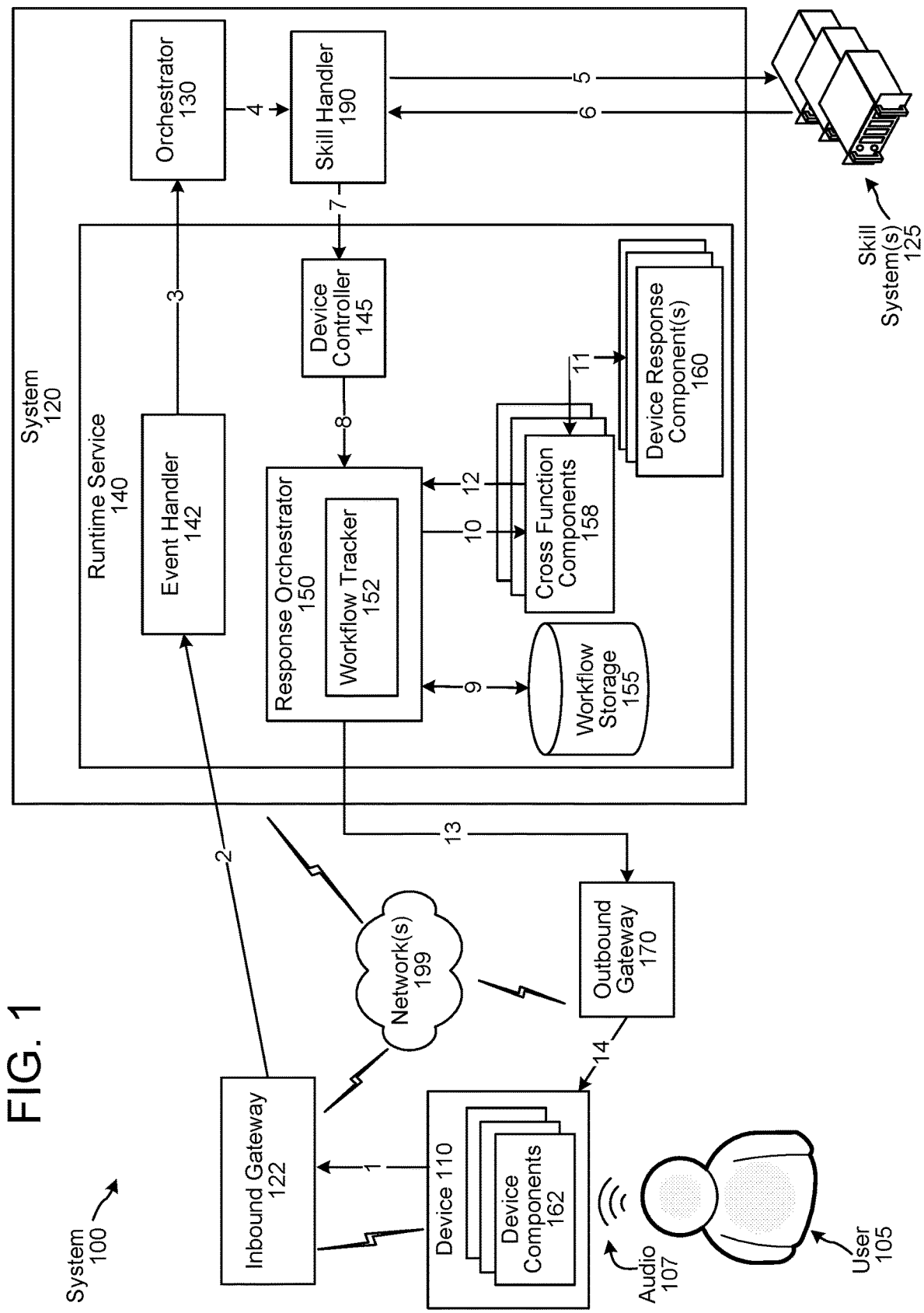
FIG. 1 is a conceptual diagram illustrating a system configured to provide responses using device capabilities, according to embodiments of the present disclosure.

Automatic speech recognition (ASR) is a field of computer science, artificial intelligence, and linguistics concerned with transforming audio data associated with speech into a token or other textual representation of that speech. Similarly, natural language understanding (NLU) is a field of computer science, artificial intelligence, and linguistics concerned with enabling computers to derive meaning from natural language inputs (such as spoken inputs). ASR and NLU are often used together as part of a language processing component of a system. Text-to-speech (TTS) is a field of computer science concerning transforming textual and/or other data into audio data that is synthesized to resemble human speech.

A system may implement one or more skill components to respond to user inputs (e.g., spoken user inputs). For example, for the user input "play music by [artist]," a music skill component may output music sung by the indicated artist. For further example, for the user input "turn on the lights," a smart home skill component may turn on "smart" lights associated with a user's profile. In another example, for the user input "what is the weather," a weather skill component may output weather information for a geographic location corresponding to the device that captured the user input.

A "skill" may refer to software, that may be placed on a machine or a virtual machine (e.g., software that may be launched in a virtual instance when called), configured to process at least NLU output data (including an intent and optionally one or more entities), and perform one or more actions in response thereto. A skill may operate in conjunction between various components of the system, such as user devices, restaurant electronic ordering systems, taxi electronic booking systems, etc. in order to complete certain functions. What is referred to herein as a skill may sometimes be referred to as an application, bot, or the like.

A capability interface in the system may define and enable a device functionality such as speech recognition, audio playback, displaying graphics (as, e.g., "cards," "widgets," "banners," "pop-ups," among others), etc. Each capability interface consists of messages called events and directives. A user device sends events to the system to indicate that something has occurred, and the system sends directives to the device instructing it to take action. For example, a user speaking to the device results in a speech recognition event, which requires special handling, such as interpreting the user's intent and invoking a skill best suited to handle it. The skill handling the intent results in one or more directives being sent from the system to the device to enable the device to output a response to the user's intent.

In some instances, performance of a functionality may involve use of multiple capability interfaces, and some of the capability interfaces may be used across multiple different workflows providing different functionalities. To enable such a "cross-cutting" functionality, an improved system of the present disclosure includes a response orchestrator that operates between skills and device components. Using the response orchestrator enables a cross-cutting functionality to be implemented as a pluggable component within a response path workflow. The response path workflow may begin when output data and/or a directive is received from a skill, and may end when a directive is dispatched to the device to enable presentation of the output data. The response path workflow may also involve some processing after the directive is dispatched to the device.

By providing cross-cutting functionalities as pluggable components, referred to herein as cross functionality components, the need to update individual component code may be eliminated. Instead, the cross functionality component can be used with multiple different workflows that involve execution of multiple different device components. For example, a cross functionality component configured as a follow-up mode component may be "plugged in" to execute after a post directive dispatch interception point, causing the follow-up mode component to execute after every directive is dispatched. A follow-up mode enables a user to engage with the system without using a wakeword for subsequent user inputs. The follow-up mode component is configured to determine whether the follow-up mode, which is enabled by default, is to be disabled based on, for example, an action that the device is instructed to perform (i.e. based on a device directive sent to the device). By plugging in the follow-up mode component at the post directive interception point, the follow-up mode component is executed regardless of the device components invoked, the directives received from a skill component, and other processing that may occur. Moreover, the individual device components do not need to be updated (otherwise coded) to invoke the follow-up mode component.

A system according to the present disclosure may be configured to incorporate user permissions and may only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1 is a conceptual diagram illustrating a system 100 configured to provide responses using cross functionalities and device capabilities. Although the figures and discussion of the present disclosure illustrate certain steps in a particular order, the steps described may be performed in a different order (as well as certain steps removed or added) without departing from the present disclosure.

As shown in FIG. 1, the system 100 may include a device 110, local to a user 105, in communication with a system 120 across a network(s) 199 and via an inbound gateway 122 and an outbound gateway 170. The network(s) 199 may include the Internet and/or any other wide- or local-area network, and may include wired, wireless, and/or cellular network hardware.

The inbound gateway 122 and the outbound gateway 170 may establish a persistent connection to the device 110 that provides a single Transmission Control Protocol (TCP) connection for multiple (HTTP) requests, eliminating the need to set up many TCP connections between the device 110 and the system 120. A persistent connection is a network communication channel that remains open for further HTTP requests and responses rather than closing after a single exchange. The device 110 client can send an arbitrary number of requests over the TCP connection before receiving any of the corresponding responses. The inbound gateway 122 may be computing device/system (e.g., a router, a server, a networking node, etc.) that sits between different networks or applications, and may convert information, data or other communications from one protocol or format to another. The outbound gateway 170 may be a computing device/system similar to the inbound gateway 122. The inbound gateway 122 and the outbound gateway 170 may transfer communications between a local-area network (e.g., an enterprise network, a private network, a home network, etc.) and the Internet. The inbound gateway 122 may be configured to send data (e.g., input data representing a user input from the user 105, device context data corresponding to the device 110, image data captured by the device 110, and the like), received from the device 110, to the runtime service 140. The outbound gateway 170 may be configured to send data (e.g., output data representing a response to the user input, notification data, and the like), received from the runtime service 140, to the device 110.

The system 120 may be a speech processing system or a voice assistant system configured to process spoken user inputs and other types of user inputs using ASR and NLU processing (or SLU processing). The system 120 may include multiple components to facilitate speech processing, such as, an orchestrator component 130 and a runtime service 140. The system 120 may also include other components described below in relation to FIG. 2. The orchestrator component 130 may be in communication with one or more skill systems 125 via a skill handler component 190.

The runtime service 140 may be included in the system 120. In other embodiments, the runtime service 140 may be implemented at a separate system (e.g., server) than the system 120. The runtime service 140 may act as a capability interface defining a set of device functionalities such as speech recognition, audio playback, displaying graphics (referred to herein as "cards", "banners", "pop-ups", "widgets", etc.), etc. The runtime service 140 may send and receive messages called events and directives. The device 110 sends events to the system 120 to indicate that something has occurred, and the system 120 sends directives to the device 110 instructing it to take action. For example, the user 105 providing device-directed speech to the device 110 results in a speech recognition event, which the system 120 processes to interpret user intent and to invoke a skill system 125 (e.g., a weather skill) best suited to handle the intent. The skill system 125 handling the intent results in directives (which may be referred to as commands or instructions) being sent to the device 110 from the system 120.

The user 105 may speak an input, and the device 110 may capture audio 107 representing the spoken input. In other examples, the user 105 may provide another type of input (e.g., selection of a button, selection of one or more displayed graphical interface elements, performance of a gesture, etc.). The device 110 may send (step 1) input audio data (or other type of input data, such as, image data, text data, etc.) corresponding to the user input to the inbound gateway 122. The inbound gateway 122 may in turn send (step 2) the input audio data (or other type of input data) to the runtime service 140, in particular to an event handler component 142.

Receipt of the input audio data may cause the event handler component 142 to generate a speech recognition event. In response to the speech recognition event, the event handler component 142 may send (step 3) the input audio data and the speech recognition event to the orchestrator component 130 of the system 120. Receipt of other input data may cause the event handler component 142 to generate another type of event (e.g., gesture recognition event, touchscreen input event, etc.), and in response, the event handler component 142 may send the other input data to the orchestrator component 130. The event handler component 142 may be configured to validate the input data received from the device 110, converge multiple instances of input data captured by the device 110 or converge multiple events generated based on receipt of multiple instances of input data, convert the received input data to an event, etc. The event handler component 142 may be invoked during an input path when an input is detected/received by the device 110.

The system 120 may process the received input audio data as described below in relation to FIG. 2. Based on processing the input audio data, the orchestrator component 130 may send (step 4) send NLU data (e.g., intent, one or more entities) to the skill handler component 190. The skill handler component 190 may send (step 5) the NLU data, and optionally other data (e.g., context data, user identifier, device identifier, etc.) to an appropriate skill system 125 for processing. The skill handler component 190 may validate the data being sent to the skill system 125, and may ensure that appropriate data is sent to an appropriate skill system. For example, certain skill systems have access to certain data and intents, while other skill systems have access to other data and intents, based on user permissions, system configurations, etc. The skill handler component 190 may determine whether the skill system 125 is allowed access to the data being sent.

The skill system 125 may process the received NLU data to determine output data responsive to the spoken input or other type of user input. For example, the output data may be weather information requested by the user 105, music requested by the user 105, product information requested by the user 105, etc. In addition to determining the output data, the skill system 125 may determine the manner in which the output data is to be presented via the device 110. For example, weather information may be presented via synthesized speech and/or graphics. As another example, music may be presented via the device 110 (and/or optionally one or more other devices 110). As yet another example, product information may be presented via graphics (e.g., using cards at the device 110). The manner in which the output data is to be presented may be represented in a directive. The skill system 125 may send (step 6) the output data and a message (dictating presentment of the output data) to the skill handler component 190. The message generated by the skill system 125 may be referred to as a skill-generated message, a system-generated message, a skill-generated directive, or a system-generated directive.

The skill handler component 190 may send (step 7) the output data and the message (as output by the skill system 125) to a device controller component 145 of the runtime service 140. In some embodiments, depending on the skill configuration, the skill system 125 may send the output data and the message directly to the runtime service 140, rather than routing it through the skill handler component 190.

The runtime service 140 is in the path for both events sent to the system 120 and messages received from the skill system 125. Individual device response components 160 may encapsulate functionality that belong to different device capability interfaces, which may be invoked via a device component(s) 162 (e.g., audio player, display interface, etc.) at the device 110. For example, the device response component 160a may generate a directive to play audio that when dispatched to the device 110 causes the device component 162a corresponding to an audio player to activate. As another example, the device response component 160b may generate a directive to open microphone (i.e. listen for inputs) that when dispatched to the device 110 causes the device component 162b corresponding to a microphone to turn on the microphone to capture inputs. A device response component 160 may generate a directive that corresponds to a particular device's capabilities, software version, etc. The device response component 160 may translate an action (and in some cases payload) indicated by the skill system 125 (in a skill-generated message) to an action that is performable (e.g., understood, recognized, etc.) by a particular device 110. For example a first device 110a may use a first type of audio player that may play audio in a first format, while a second device 110b may use a second type of audio player that may play audio in a second format. A first directive for the first device 110a may be generated by the device response component 160 and may include a first device component 162 of the first device 110a and may include audio (in the payload) in the first format. Similarly, the device response component 162 may generate a second directive for the second device 110b that includes different payload and device component. In some embodiments, a first device response component 160a may correspond to a first device 110a, a second device response component 160b may correspond to a second device 110b, etc. In other embodiments, the same device response component 160 may be configured to generate device directives for multiple different devices.

A directive generated by the device response component 160 to cause operation of the device component 162 may be referred to as a device-facing directive. In addition to causing corresponding device components 162 to operate, the device response components 160 may also cause performance of other actions described herein. Some of the device response component(s) 160 may provide capability interface agnostic abstraction over events by performing event validation, device/software version normalization, and transformation resulting in higher level events that are then routed to the skill system 125. The device response component(s) 160 may provide abstraction over skill/system generated directives by performing translation to device-specific versions (i.e. device-facing directives), device directive validation and interface specific functionality (if any) such as converting text to speech, profanity filtering, etc.

A device directive/device-facing directive, which may be sent by the system 120 to the device 110, may include a header, an endpoint, and a payload. The header may identify an action or message being conveyed via the directive. The action or message may be identified using an action/message name, action/message identifier, action/message type, etc. Examples of an identified action/message include TurnOn, AdjustPercentage, TurnUp, TurnDown, TurnOff, PlayBack, StopPlayBack, PlayQueue, ErrorResponse, ReportDeviceState, etc. The header (or payload in some embodiments) may identify a device component 162 (using, for example, a device component name, a device component identifier, etc.) to be used to perform the identified action or respond to the message. The header may also include an identifier (e.g., a directive identifier) to enable further processing (e.g., troubleshooting, logging, etc.) with respect to the device directive. The endpoint may identify a device 110 (using, for example, a device identifier) that is to process the device directive. In some cases, the device directive may identify more than one device that are to process the device directive. In other cases, the system 120 may send individual device directives for each device that is to process the device directive. The payload may include action/message parameters, which may depend on the type of action/message, the type of device component, and other information. Such parameters may correspond to output data (e.g., audio data, text data, image data, notification data, etc.) to be presented via the device 110, data to be used to perform the action (e.g., a volume value, a temperature value, a media track to be played, etc.), and the like. The payload may also include a payload version (e.g., API version, software version, system version, etc.).

An example device response component 160 may be a speech synthesizer or a text-to-speech (TTS) component. The TTS component generates audio data including synthesized speech. The data input to the TTS component may come from a skill system 125, the orchestrator component 130, or another component of the system 120. In one method of synthesis called unit selection, the TTS component matches input data against a database of recorded speech. The TTS component selects matching units of recorded speech and concatenates the units together to form audio data. In another method of synthesis called parametric synthesis, the TTS component varies parameters such as frequency, volume, and noise to determine audio data including an artificial speech waveform. Parametric synthesis uses a computerized voice generator, sometimes called a vocoder.

A message received from the skill system 125 (e.g., skill-generated message) may include, similar to a device directive, a header, an endpoint, and a payload. The header may identify an action or message being conveyed by the skill. The action or message may be identified using an action/message name, action/message identifier, action/message type, etc. In some embodiments, the header (or payload in some embodiments) may also identify a device interface or capability (e.g., audio player, display interface, synthesized speech player, etc.) to be used to perform the identified action or respond to the message. The header may also include an identifier (e.g., a skill message identifier) to enable further processing (e.g., troubleshooting, logging, etc.) with respect to the skill-generated message. The endpoint may identify a device 110 (using, for example, a device identifier) with respect to which the message is being sent. The identified device may be one that the skill prefers or identifies that the device to output data, perform an action, etc. However, as described herein, the system 120 may select a different device to present the output data, perform an action, etc. In some cases, the skill-generated message may identify more than one device. In other cases, the skill may send individual messages for each relevant device. The payload may include action/message parameters, which may depend on the type of action/message, the type of device interface/capability, and other information. Such parameters may correspond to output data (e.g., audio data, text data, image data, notification data, etc.) to be presented via the device 110, data to be used to perform the action (e.g., a volume value, a temperature value, a media track to be played, etc.), and the like. The payload may also include a payload version (e.g., API version, software version, system version, etc.).

The runtime service 140 may include one or more cross functionality components 158, which may be components that are "pluggable" into different workflows. Such cross functionality components 158 may be invoked ("plugged-in") at what is referred to herein as interception points. Further details on interception points are described below.

The device controller component 145 may select a host, from a plurality of hosts, to send the output data and the directive. The system 120 (or portions of thereof) may be implemented at multiple host systems. The device controller component 145 may select the host based on which host received the input data/event (at step 2), which host is available to process, which host the device 110 is connected to, etc. Based on selecting the host, the device controller component 145 may send (step 8) the output data and the system-generated directive to the response orchestrator 150 of the selected host.

The response orchestrator component 150 may retrieve (step 8) a workflow from a workflow storage 155, where a workflow may define an execution plan (e.g., order in which the cross functionality components 158 and the device response components 160 are to be called, type of data to be inputted to the components 158, 160, type of data outputted by the components 158, 160, other actions to be performed for particular components 158, 160, etc.). The response orchestrator component 150 may retrieve the workflow based on the system-generated directive received from the skill system 125. For example, if the system-generated directive relates to moving playback of media content from one device to another, or relates to synchronized/group device playback of media content, then the response orchestrator 150 may retrieve a workflow corresponding to media portability.

Adding a new function, changing the execution order or overriding the entire orchestration flow may be achieved by modifying or replacing the workflow definition without modifying hardwired software code. In some embodiments, the workflow storage 155 may be deployed as a cloud storage, for example, using Amazon Web Services Simple Solution Storage (AWS S3) provided by Amazon.com Inc. AWS S3 provides object storage through a web service interface. Changes to the workflow storage 155 may be polled/checked on a periodic basis by the runtime service 140 using a background processing thread.

The runtime service 140 may enable functionality that corresponds to (e.g., cross-cutting functionality) multiple different interfaces/device response components 160. Such functionality may be defined in the workflow as invocation of a cross functionality component 158. Example cross-cutting functionalities, implemented by the cross functionality components 158, include device targeting, endpoint activation, correlation token injection, NTT mode, fetch task attributes, follow-up mode, etc. In some embodiments, a cross functionality component 158 may be a device directive component configured to convert system-generated directives to device-facing directives that correspond to a particular device response component 160. The device directive (cross functionality) component may use one or more rules, mapping data, or other type of data to determine a device-facing directive and a device response component 160 corresponding to the directive provided by the skill system 125. For example, the system-generated directive may indicate that the output data is to be presented as synthesized speech, and the device directive (cross functionality) component may determine that a device response component 160a corresponding to a speech synthesizer is to be used to generate the synthesized speech. As another example, the system-generated directive may indicate that the output data is music, and the device directive (cross functionality) component may determine that a device response component 160b corresponding to audio playback is to be used to cause the appropriate device component 162 to execute. The device directive component may be implemented as a cross functionality component 158 so that it can be invoked across multiple different workflows.

Another example cross functionality component 158 may be a directive handler component configured to invoke device response components 160 based on a determination made by the device directive (cross functionality) component. In some embodiments, the response orchestrator 150 may invoke the device response component 160 via the directive handler (cross functionality) component. In other embodiments, the response orchestrator 150 may directly invoke the device response component 160. The directive handler component may be implemented as a cross functionality component 158 so that it can be invoked across multiple different workflows.

Another example cross functionality component 158 may be a directive dispatch component configured to dispatch (i.e. send) device-facing directives to the device 110 to cause operation of corresponding device component(s) 162. The directive dispatch component may be implemented as a cross functionality component 158 so that it can be invoked across multiple different workflows.

The workflow storage 155 may store a definition for how individual cross functionality components 158 and device response components 160 are to be executed/used, where the definition may include an "interception point" which represents when the component is to be invoked. The definition may a) specify data entities required to perform the function (input) and data entities produced as result (output) b) an execution condition(s) under which the component 158, 160 should be executed c) execution type—synchronous or asynchronous; and d) a component invocation mechanism (e.g., Local, REST, LAMBDA, etc.). The definition includes implementing an SPI (execute( ) method) (e.g., as a Groovy or Java script), and the response orchestrator component 150 may invoke the component 158, 160 using this SPI by providing the input specified in the definition. Below is a sample definition (for illustration purposes):

```
{
    "name" : "TargetComputation" ,
    "input" : {
        "<entity 1>", "<entity 2>"
    },
    "output" : {
        "<entity 1>", "<entity 2>"
    },
    "executionCondition" : {"always"},
    "execution Type" : { "async" | "sync" },
    "invocationType" : "LAMBDA"|"LOCAL"|"FLOWS" | "
    "weblab": {
        "name" : <weblab name>
    },
    "version" : "1.0",
}
```

In some embodiments, the workflow may indicate that a device response component 160 is to be invoked, in which case, the response orchestrator component 150 may invoke the directive handler (cross functionality) component 158 to invoke the device response component 160 indicated in the workflow.

The response orchestrator component 150 may support different execution patterns for components, including (a) sequential execution, (b) conditional execution, (c) recursion execution, (d) fork/joint execution, and (e) asynchronous execution. In sequential execution, the cross functionality component 158a (e.g., a follow-up evaluation component) is invoked only after the directive dispatch (cross functionality) component 158b has completed processing. In conditional execution the cross functionality component 158a (e.g., endpoint activation component) may only be invoked when a condition(s) is satisfied (e.g., for visual-related directives). In recursion execution, the cross functionality component 158a may process recursively when a condition(s) is satisfied, for example, translation of system-generated directives, by the device directive (cross functionality) component, to device-facing directives could be a recursive process if translation of one results in additional directives (e.g., audio player play directive translation results in speaker unmute system directive). In the fork/joint execution, the response orchestrator component 150 may run all pre-device directive components in parallel, and wait for them to complete before running the device directive (cross functionality) component. In asynchronous execution, the response orchestrator component 150 may block execution of the cross functionality component 158a or the device response component 160a when input data is required; otherwise execute it asynchronously. Additionally, the response orchestrator component 150 may support asynchronous workflow execution, for example, may pause workflow execution while waiting on events (e.g., speech capture is finished, user is done speaking), and may continue execution later when the events are received.

The response orchestrator component 150 may support traceability for debugging and performance evaluation. For example, the response orchestrator component 150 may track which workflow is executed and when, in response to which event/user input and/or which system generated directive, which components 158, 160 are executed, time taken for execution (e.g., to track latency), etc.

The runtime service 140 may employ a workflow orchestration system to facilitate workflow management and execution. One example workflow orchestration system may be built using Apache Groovy, which is a dynamic language that can be used as a programming or a scripting language; is Java syntax compatible and is compiled to JVM bytecode; and interoperates seamlessly with other Java code and libraries. Groovy may be used as the workflow definition language. The default Groovy compiler may be extended to add workflow memes and restrictions to the general language that are not useful for workflows. These extensions may prevent malicious code at compile time, time boxes execution, enable sandboxes for multiple scripts, and enable auditing the execution while enabling workflow memes.

Another example workflow orchestration system may be built using AWS Step Functions provided by Amazon.com Inc. Using AWS Step Functions may require each service/device response component owner to implement a message poller.

Another example workflow orchestration system may be built using Amazon Simple Workflow Service (SWF) provided by Amazon.com Inc. SWF may be used to build applications that coordinate work across distributed components. In SWF, a task represents a logical unit of work that is performed by a component of an application. SWF may be intended for long running back-end tasks, while the runtime service 140 provides a front-end task. SWF may use resources dedicated to messaging between the coordinator, decider, and worker.

Another example workflow orchestration system may be built using Amazon Herd provided by Amazon.com Inc. Herd offers a synchronous workflow execution, which starts execution of a workflow within a certain time period of a call/invocation.

The workflow orchestration system implemented by the runtime service 140 may execute each step (i.e. cross functionality component 158, interception calls, dynamic workflow generation, etc.) on the same host/system, thus avoiding network hops between step executions and avoiding the need to persist the execution state at the end of each step, both of which may impact user perceived latency.

The workflow orchestration system implemented by the runtime service 140 may be control driven instead of data driven, where in a control driven engine control messages are generated to control execution of a step. In a data driven engine, the workflow is represented as a sequence of data messages instead of sequence of steps. The runtime service 140 is more control driven than data driven requiring sequencing and control structures (e.g., conditional execution, looping, etc.). In some embodiments, the runtime service 140 may be a hybrid workflow solution using a combination of control driven and data driven techniques.

The runtime service 140 may validate workflow definitions by checking for syntactic and logical errors, such as referencing data entities not produced by any of the cross functionality components 158 or the device response components 160. Additionally, the response orchestrator component 150 may validate execution by the cross functionality components 158 and the device response component(s) 160 by validating data entities produced as a result of execution to match the ones specified in the component definition and catch any breaches to the component definition.

The runtime service 140 may also support user experience testing (e.g., AB testing, also referred to as weblab testing). The component definition may specify the testing criteria (the weblab) that controls its launch. Rather than each cross functionality component 158 implementing its own testing (weblab) integration, the response orchestrator component 150 may make the testing criteria as a main-class object supporting all the operations of the respective cross functionality component 158.

The runtime service 140 may enforce a maximum limit on execution time for the cross functionality components 158 and the device response components 160 to meet certain user perceived latency standards or to reduce user perceived latency, since the runtime service 140 operates in the response path of the user-system interaction. The maximum limit on execution time may be different based on system configurations. The maximum limit on execution time may be modified for certain components 158, 160 only when certain conditions are satisfied.

Figure 3:
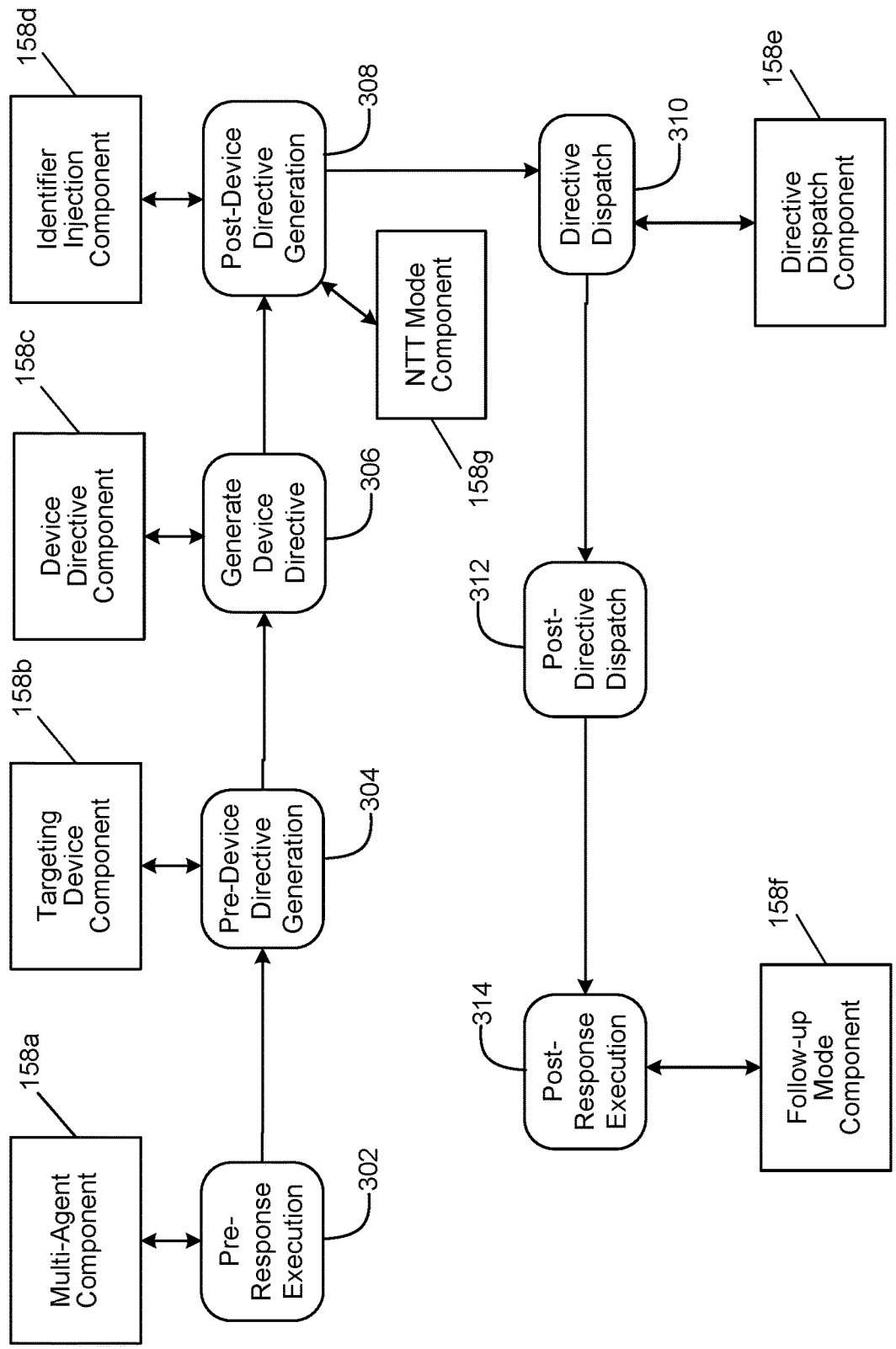
FIG. 3 illustrates an example workflow with interception points, according to embodiments of the present disclosure.

An example workflow along with example interception points is shown in FIG. 3. Referring to FIG. 3, one or more steps to be executed, according to the workflow, may be considered as interception points, where one or more cross functionality components 158 may be "plugged-in" to process. FIG. 3 illustrates the following sequential steps/interception points: pre-response execution 302, pre-device directive generation 304, generate device directive 306, post-device directive generation 308, directive dispatch 310, post-directive dispatch 312, and post-response execution 314.

The pre-response execution point 302 may occur when the runtime service 140 receives the system-generated directive from the skill system 125, at which point the response orchestrator 150 may retrieve a workflow based on the system-generated directive. The workflow may indicate that a multi-agent (cross functionality) component 158a is to be invoked. Prior to invoking the device directive (cross functionality) component 158c, a pre-device directive generation point 304 may occur, during which, a targeting device (cross functionality) component 158b may be invoked. At a generate device directive point 306, the device direction (cross functionality) component 158c may be invoked to translate the system-generated directive to a device-facing directive, and to determine a corresponding device response component 160 to invoke. After that, a post-device directive generation point 308 may occur, during which an identifier injection (cross functionality) component 158d and/or a NTT model (cross functionality) component 158g may be invoked. Additionally, the directive handler (cross functionality) component may also be invoked to call the device response component 160 corresponding to the device-facing directive (determined at point 306). At this point (a directive dispatch point 310) a directive is dispatch (i.e. sent) to the device 110 by invoking the directive dispatch (cross functionality) component 158e to send (step 11 of FIG. 1) the directive to the outbound gateway 170. After this, a post-directive dispatch point 312 may occur, during which one or more cross functionality components 158 may be invoked according to the retrieved workflow. A post-response execution point 314 may occur after components for the post-directive dispatch point 312 have executed. During the post-response execution point 314, the follow-up mode (cross functionality) component 158f may execute.

By invoking different cross functionality components 158 at different interception points, the runtime service 140 enables implementation of cross-cutting functionalities across multiple workflows based on workflow progress. In some embodiments, a component SPI may be employed to integrate invocation of the cross functionality component with the response orchestrator component 150. Using well defined SPIs to plug-in components eliminates the need to use hard-coded logic and update code at multiple interception points to insert cross-cutting functions. A Document Model may be used to pass data between the cross functionality components 158.

The workflow defines which cross functionality component 158 is to be inserted at which interception point, and the individual cross functionality components 158 comprise the logic for its processing. In this manner, how and when a cross functionality component 158 is invoked it is separated from what the cross functionality component 158 does. In some embodiments, the individual cross functionality components 158 may be configured to perform different unrelated (or related) processing, and may be programmed, maintained or otherwise configured by different software development teams.

The various skill systems 125 can invoke different device response components 160 based on the directive generated by the skill system 125. For example, the directive to play audio may cause a device response component 160a corresponding to audio playback to execute. As another example, the directive to output synthesized speech may cause a device response component 160b corresponding to a speech synthesizer (or text-to-speech (TTS) processing) to execute. As a further example, the directive to display graphics may cause a device response component 160c corresponding to a display interface to execute.

In some embodiments, the cross functionality components 158, inserted at the pre-device directive generation point 304 and the pre-response execution point 302, may be executed in parallel/asynchronously/at substantially the same time. This may reduce user perceived latency in the system responding to the user input.

In some embodiments, a cross functionality component 158 may be invoked based on a definition provided by the component developer/owner. For example, the definition of the cross functionality component 158g, included in the workflow storage 155, may indicate that the cross functionality component 158g is to be invoked at the pre-device directive generation interception point 304, and when the workflow execution reaches the point 304, the response orchestrator 150 may invoke the cross functionality component 158g. In such embodiments, the response orchestrator 150 may dynamically generate a workflow (i.e. determine which components to invoke) based on occurrence of the interception points.

In other embodiments, the response orchestrator component 150 may invoke a cross functionality component 158 based on an execution order defined in the workflow. For example, a media portability workflow may indicate that a first cross functionality component is to execute, followed by a second cross functionality component, etc.

The multi-agent component 158*a* may be configured to handle interactions with different systems that may be referred to using different names. For example, a user request may be handled by a [first name] system, and the output data by the skill system 125 may be preceded by a preamble: "[first name] will help you with that" to indicate to the user which system (agent) is responding. The preamble may be presented as synthesized speech or displayed text. The preamble is to be rendered before the output data by the skill system 125 is rendered, but the preamble should not be rendered if the skill system 125 does not generate any output data. The multi-agent component 158*a* may be invoked at the pre-response execution point 302 to have the preamble rendered prior to any processing performed with respect to the response/output data from the skill system 125.

The targeting device component 158*b* may be configured to select a device 110*a* from two or more devices 110 that is to present the output/perform the action determined by the skill system 125. The targeting device component 158*b* may select the device 110*a* based on various information, such as device capabilities, user context information, device context information, device state, user profile information, etc. The targeting device component 158*b* may be executed prior to the generate device directive point 306, so that the device directive generated at the point 306 corresponds to the selected device 110*a*. Different devices have different capabilities, and thus correspond to different device response components 160, thus, it is beneficial to know the target device prior to generating the device directive.

The identifier injection component 158*d* may be configured to inject/insert an identifier or associate an identifier with the device-facing directive (generated at the point 306) to track further processing performed with respect to the directive. The injected/inserted identifier may identify a message(s) exchange between the system 120 and the skill system 125. In some cases, the skill system 125 may receive a message (or an event, a directive, etc.) from the system 120 and including an identifier. The skill system 125 may send a message (system-generated directive) in response to the message, and the message from the skill may include the same identifier so that the skill-generated message and the message from the system 120 can be correlated. The identifier, inserted by the component 158*d* in the device directive, may be the same identifier included in the skill-generated message. In some cases, the skill system 125 may initiate a message exchange, in which case, the skill-generated message would be the first message in the exchange. In such cases, the skill-generated message may not include an identifier. In such cases, the identifier injection component 158*d* may generate a new identifier and insert it in the device directive. The new identifier may further be inserted or associated with the skill-generated message to identify the instant message exchange.

In some embodiments, the multi-agent device component 158*a*, the targeting device component 158*b*, the identifier injection component 158*d*, and the follow-up mode component 158*f* may be referred to as "plug-in" or "pluggable" components, where these components may be invoked based on the interception points of the workflow regardless of which device response components 160 are invoked or which directives are dispatched. The response orchestrator component 150 enables the response path to be controlled and instanced as a workflow architecture with pluggable components, a standardized plugin SPI, and a standardized data sharing model (e.g., Data Container+Document Model) for better management of components.

The cross functionality components 158 may follow a producer/consumer model. A cross functionality component 158 can produce arbitrary data and/or consume data produced by other components. Components in the response path may have a need to share data between one another (e.g. targeting device component 158*b* may need metadata such as user identifier, device account identifier, etc.). The data model implemented for the runtime service 140 may use Document Model, which is a high performance, federated, entity-relationship model used to pass data between services in an environment. The data model for cross functionality components 158 contains entities that can have relationships to other entities, which may be represented as a graph structure or multi-nested map.

Entities may have metadata, which is used to identify the particular entity type and the actual entity data/value. There can be multiple entities of the same type (e.g. multiple target endpoints for a particular directive), but each entity may have a unique entity identifier. These entities are stored directly into the Data Container. Entities can be related to multiple other entities, even of the same type. These relationships may be unidirectional.

In some embodiments, the plugin SPI may include a canHandle( ) and a handle( ) call. The response orchestrator component 150 may first invoke a canHandle( ) for a cross functionality component 158, and if the response to the canHandle( ) is true, then the response orchestrator component 150 may invoke a handle( ) for the cross functionality component 158 to cause the cross functionality component 158 to execute. The input to the canHandle( ) and the handle( ) is a data container, and the output of the handle( ) is another data container or exception/error details. A data container is a data structure that stores and organizes virtual objects (a virtual object is a self-contained entity that consists of both data and procedures to manipulate the data).

In some embodiments, the canHandle( ) request may be sent by the response orchestrator component 150 at the pre-response execution point 302 to all (or a subset) of the cross functionality components 158 to determine which cross functionality components 158 are to be invoked during the workflow. In other embodiments, the response orchestrator 150 may send the canHandle( ) request to all (or a subset) of the cross functionality components 158 at each interception point (e.g., 302, 304, 306, 308, 310, 312 and 314) to determine, based on the response to the canHandle( ) request, which cross functionality components 158 are to be invoked at the respective interception points.

Directives may be stored in the data container individually. In some cases, such as SpeechSynthesizer.SpeakAndListen, there can be multiple directives pending dispatch to the device 110 (e.g., Speaker.unMute+SpeechSynthesizer.Speak+SpeechRecognizer.Listen). Such multiple directives may be represented in a directive queue, in an ordered manner, which may be stored as an entity (inputtable to the cross functionality components 158). In some embodiments, such an entity may be associated with metadata that is a queue of directive entity identifiers, and then a directive queue (cross functionality) component 158 may translate the metadata into a queue of actual directive objects.

Based on the workflow, the response orchestrator component 150 may perform one or more actions, such as invoke the cross functionality component(s) 158, send messages to external system(s), pause or resume processing by the cross functionality component(s) 158 based on data received from the external system(s), etc. Referring again to FIG. 1, the response orchestrator component 150 may send (step 10) a command to the cross functionality component(s) 158 to invoke it. In some cases, depending on the type of cross functionality component 158, the response orchestrator component 150 may also send data needed by the cross functionality component 158 to perform its processing.

At least one of the cross functionality component 158 (e.g., the device directive component) may invoke (step 11) a device response component 160. Such invocation may be, in some cases, to generate a device-facing directive corresponding to the system-generated directive.

The cross functionality component(s) 158 may send (step 12), to the response orchestrator component 150, data corresponding to the processing performed.

The response orchestrator component 150 may send (step 13) a command and/or data to the outbound gateway 170, and the outbound gateway 170, in turn, may send (step 14) the command and/or data to the device 110. Receipt of the command and/or data may cause the device 110 to present the data using an appropriate output channel. For example, the response orchestrator component 150 may send audio data representing synthesized speech, and receipt of the audio data may cause the device 110 to output the audio data using one or more speakers of the device 110. Receipt of the command may cause execution of one or more device components 162. For example, a first device component 162 may be configured to output synthesized speech (e.g., provided as an XML link). As another example, a second device component 162 may be configured to output visual data (e.g., provided via a system-specific presentation language).

A workflow tracker 152 of the response orchestrator component 150 may track which cross functionality components 158 are invoked and which directives are sent to the device 110. The workflow tracker 152 may also track progress of the workflow execution, that is, which point (e.g., interception points shown in and described with respect to FIG. 3) of the workflow is being executed. Some of the cross functionality components 158 may need data determined during the workflow execution. Some of the cross functionality components 158 may be triggered based on which device directives are dispatched and/or which cross functionality components 158 are invoked. For example, a resource management component 158g may be configured to track resources (e.g., audio player, media player, display, etc.) being used at the device 110 based on the directives dispatched to the device 110. The resource management component 158g may execute at the post-directive dispatch point 312 (shown in FIG. 3) based on the workflow tracker 152 indicating that the workflow has arrived at the post directive dispatch point 312.

The workflow tracker 152 may also be used to determine when an interaction has ended, thus, data corresponding to the interaction can be discarded. In some cases, the data corresponding to a particular interaction is discarded when a "speech finished" event is received by the runtime service 140 from the inbound gateway 122. In some cases, the data corresponding to a particular interaction is also discarded when an error occurs and no directives are dispatched to the device 110. Using the workflow tracker 152, the system can determine that no directives have been dispatched to the device 110 in response to an event received by the runtime service 140 or within a certain time period of receiving the latest event.

Figure 2:
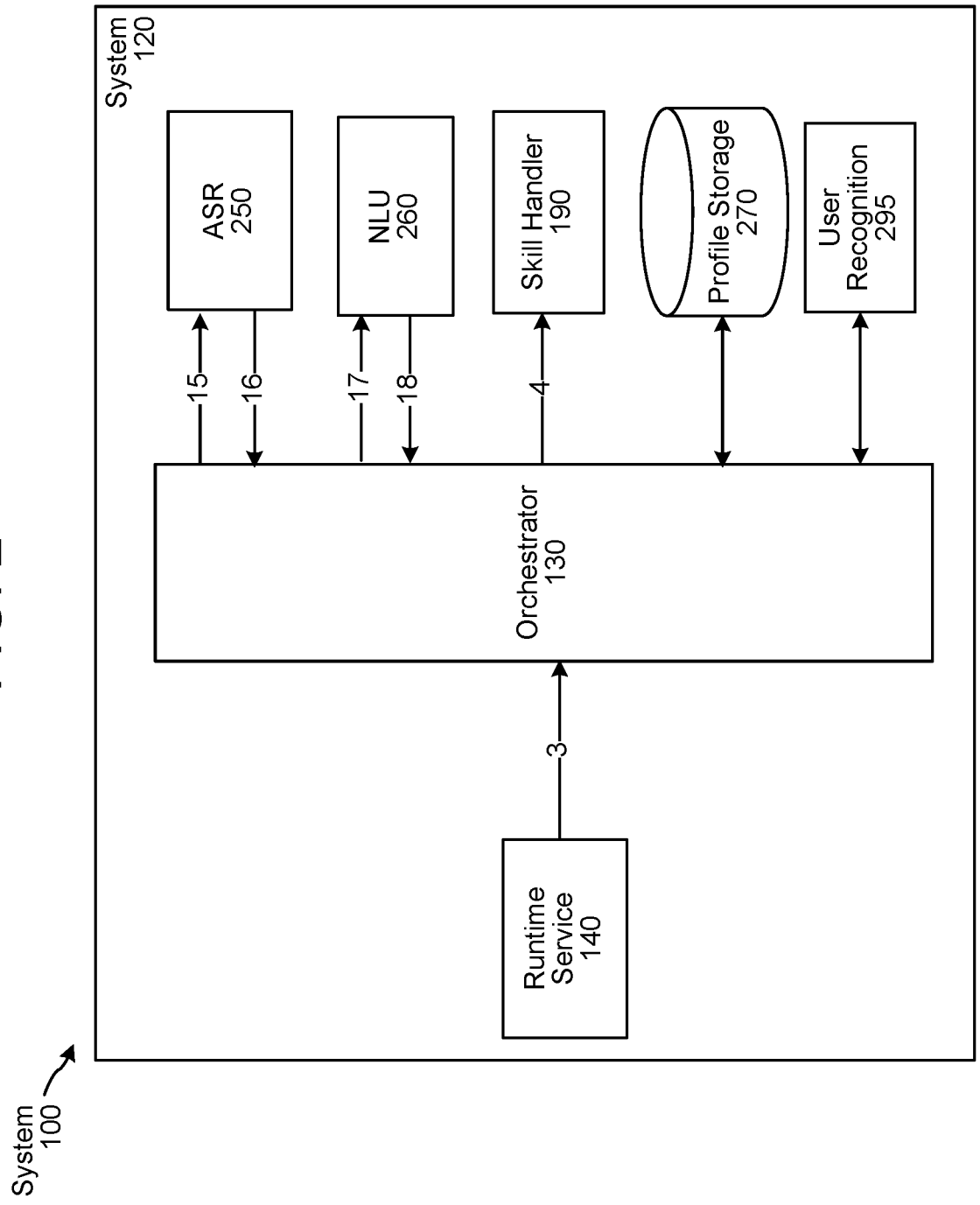
FIG. 2 is a conceptual diagram illustrating a system configured to process user inputs and provide responses using device capabilities, according to embodiments of the present disclosure.

FIG. 2 illustrates processing that may be performed by the system 120 to determine output data responsive to a user input. The orchestrator component 130 may receive the input audio data or other input data from the runtime service 140. In the case that the input data is audio data, the orchestrator component 130 may send (step 15) the input audio data to the ASR component 250, and the ASR component 250 may process the input audio data to determine ASR output data including one or more ASR hypotheses (e.g., token data, natural language text data, etc.) corresponding to the words spoken by the user 105. The ASR component 250 transcribes the input audio data into ASR output data including one or more ASR hypotheses. An ASR hypothesis may be configured as a textual interpretation of the speech, or may be configured in another manner, such as one or more tokens. Each ASR hypothesis may represent a different likely interpretation of the speech in the audio data. Each ASR hypothesis may be associated with a score representing a confidence of ASR processing performed to determine the ASR hypothesis with which the score is associated.

The ASR component 250 interprets the speech in the input audio data based on a similarity between the audio data and pre-established language models. For example, the ASR component 250 may compare the audio data with models for sounds (e.g., subword units, such as phonemes, etc.) and sequences of sounds to identify words that match the sequence of sounds of the speech represented in the audio data. In other embodiments, the ASR component 250 may use one or more neural-based techniques (e.g., RNN, RNN-T, transformer-based models, etc.) to determine the ASR output data.

The ASR component may send (step 16) the ASR output data to the orchestrator component 130. The orchestrator component 130 may send (step 17) the ASR output data to the NLU component 260, and the NLU component 260 may process the ASR output data to determine NLU output data corresponding to the user input. The NLU output data may include more than one NLU hypothesis, where each NLU hypothesis includes an intent, a domain, one or more entities (to the extent such are mentioned in the user input), and a confidence score of NLU processing to generate the NLU hypothesis. The NLU component 260 may perform intent classification to determine the intent, named entity recognition (NER) processing to identify portions of the user input that relate to entities (e.g., persons, places, and things) and corresponding entity types, and domain classification to determine the domain.

The NLU component 260 processes the ASR output data to determine NLU output data including one or more NLU hypotheses. The NLU component 260 may perform intent classification (IC) processing on ASR output data to determine an intent of the user input. An intent corresponds to an action to be performed that is responsive to the user input. To perform IC processing, the NLU component 260 may communicate with a database of words linked to intents. For example, a music intent database may link words and phrases such as "quiet," "volume off," and "mute" to a <Mute> intent. The NLU component 260 identifies intents by comparing words and phrases in the ASR output data to the words and phrases in an intents database. In some embodiments, the NLU component 260 may communicate with multiple intents databases, with each intents database corresponding to one or more intents associated with a particular skill system 125.

For example, IC processing of the user input "play my workout playlist" may determine an intent of <PlayMusic>. For further example, IC processing of the user input "call mom" may determine an intent of <Call>. In another example, IC processing of the user input "call mom using video" may determine an intent of <VideoCall>. In yet another example, IC processing of the user input "what is today's weather" may determine an intent of <OutputWeather>.

The NLU component 260 may also perform named entity recognition (NER) processing on the ASR output data to determine one or more portions, sometimes referred to as slots or entities, of the user input that may be needed for post-NLU processing (e.g., processing performed by a skill). For example, NER processing of the user input "play [song name]" may determine an entity type of "SongName" and an entity value corresponding to the indicated song name. For further example, NER processing of the user input "call mom" may determine an entity type of "Recipient" and an entity value corresponding to "mom." In another example, NER processing of the user input "what is today's weather" may determine an entity type of "Date" and an entity value of "today."

In at least some embodiments, the intents identifiable by the NLU component 260 may be linked to one or more grammar frameworks with entity types to be populated with entity values. Each entity type of a grammar framework corresponds to a portion of ASR output data that the NLU component 260 believes corresponds to an entity. For example, a grammar framework corresponding to a <PlayMusic> intent may correspond to sentence structures such as "Play {Artist Name}," "Play {Album Name}," "Play {Song name}," "Play {Song name} by {Artist Name}," etc.

For example, the NLU component 260 may perform NER processing to identify words in ASR output data as subject, object, verb, preposition, etc. based on grammar rules and/or models. Then, the NLU component 260 may perform IC processing using the identified verb to identify an intent. Thereafter, the NLU component 260 may again perform NER processing to determine a grammar model associated with the identified intent. For example, a grammar model for a <PlayMusic> intent may specify a list of entity types applicable to play the identified "object" and any object modifier (e.g., a prepositional phrase), such as {Artist Name}, {Album Name}, {Song name}, etc. The NER processing may then involve searching corresponding fields in a lexicon, attempting to match words and phrases in the ASR output data that NER processing previously tagged as a grammatical object or object modifier with those identified in the lexicon.

NER processing may include semantic tagging, which is the labeling of a word or combination of words according to their type/semantic meaning. NER processing may include parsing ASR output data using heuristic grammar rules, or a model may be constructed using techniques such as hidden Markov models, maximum entropy models, log linear models, conditional random fields (CRFs), and the like. For example, NER processing with respect to a music skill may include parsing and tagging ASR output data corresponding to "play mother's little helper by the rolling stones" as {Verb}: "Play," {Object}: "mother's little helper," {Object Preposition}: "by," and {Object Modifier}: "the rolling stones." The NER processing may identify "Play" as a verb based on a word database associated with the music skill, which IC processing determines corresponds to a <PlayMusic> intent.

The NLU component 260 may generate NLU output data including one or more NLU hypotheses, where each NLU hypothesis includes an intent and optionally one or more entity types and corresponding entity values. In some embodiments, a NLU hypothesis may be associated with a score representing a confidence of NLU processing performed to determine the NLU hypothesis with which the score is associated.

The NLU component 260 may send (step 18) the NLU output data to the orchestrator component 130, which may send (step 4) the NLU output data to the skill handler component 190. The skill handler component 190 may send the NLU output data (and optionally other data) to the skill system 125.

The skill system 125 may process to determine output data responsive to the user input (e.g., based on an intent and the entity(ies) of the user input, as represented in the NLU output data received by the skill system 125). For example, if the user input requests the playing of a song, the output data may be an audio file (or link to an audio file) corresponding to the song. For further example, if the user input requests weather information, the output data may be structured or natural language data corresponding to the requested weather information. The skill system 125 may also generate a directive for presenting the output data. For example, the skill system 125 may generate a directive to play an audio file. As another example, the skill system 125 may generate a directive to display graphics.

The system 120 may use one or more other components to facilitate responding to the user input. The user recognition component 295 may recognize a user, as providing a user input, using various data. The user recognition component 295 may take as input the input audio data. The user recognition component 295 may perform user recognition by comparing speech characteristics, in the input audio data, to stored speech characteristics of users. The user recognition component 295 may additionally or alternatively perform user recognition by comparing biometric data (e.g., fingerprint data, iris data, retina data, etc.), received by the system 120 in correlation with a user input, to stored biometric data of users. The user recognition component 295 may additionally or alternatively perform user recognition by comparing image data (e.g., including a representation of at least a feature of a user), received by the system 120 in correlation with a user input, with stored image data including representations of features of different users. The user recognition component 295 may perform other or additional user recognition processes, including those known in the art. For a particular user input, the user recognition component 295 may perform processing with respect to stored data of users associated with the device 110 that received the user input.

The user recognition component 295 determines whether a user input originated from a particular user. For example, the user recognition component 295 may determine a first value representing a likelihood that a user input originated from a first user, a second value representing a likelihood that the user input originated from a second user, etc. The user recognition component 295 may also determine an overall confidence regarding the accuracy of user recognition processing.

The user recognition component 295 may output a single user identifier corresponding to the most likely user that originated the user input. Alternatively, the user recognition component 295 may output multiple user identifiers (e.g., in the form of an N-best list) with respective values representing likelihoods of respective users originating the user input. The output of the user recognition component 295 may be used to inform ASR processing, NLU processing, processing performed by a skill system 125, as well as processing performed by other components of the system 120 and/or other systems.

The system 120 may include profile storage 270. The profile storage 270 may include a variety of data related to individual users, groups of users, devices, etc. that interact with the system 120. As used herein, a "profile" refers to a set of data associated with a user, group of users, device, etc. The data of a profile may include preferences specific to the user, group of users, device, etc.; input and output capabilities of one or more devices; internet connectivity data; user bibliographic data; subscription data; skill enablement data; and/or other data.

The profile storage 270 may include one or more user profiles. Each user profile may be associated with a different user identifier. Each user profile may include various user identifying data (e.g., name, gender, address, language(s), etc.). Each user profile may also include preferences of the user. Each user profile may include one or more device identifiers, each representing a respective device registered to the user. Each user profile may include skill identifiers of skill systems 125 that the user has enabled. When a user enables a skill system 125, the user is providing the system 120 with permission to allow the skill system 125 to execute with respect to the user's user inputs. If a user does not enable a skill system 125, the system 120 may not execute the skill system 125 with respect to the user's user inputs.

The profile storage 270 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may be associated with (or include) one or more device profiles corresponding to one or more devices associated with the group profile.

The profile storage 270 may include one or more device profiles. Each device profile may be associated with a different device identifier. A device profile may include various device identifying data, input/output characteristics, networking characteristics, etc. A device profile may also include one or more user identifiers, corresponding to one or more user profiles associated with the device profile. For example, a household device's profile may include the user identifiers of users of the household.

The runtime service component 140 enables various kinds of interactions with the system 120. One example interaction may be referred to as media portability, which is aimed at enabling users to move media content (e.g., music, books, podcasts etc.) from one device 110 to another device 110, and also add/remove devices from an ongoing playback (also called dynamic device grouping) without disruption of the playback. To support media portability interactions, the runtime service component 140 may store and use a media portability workflow.

FIGS. 4A-4B illustrate an example signal flow for facilitating a media portability interaction where media content is moved. The skill system 125 may send (402), to the response orchestrator component 150 (via the device controller component 145 and in some cases the skill handler component 190), a system generated directive to move media content. The response orchestrator component 150 may retrieve (404) a workflow corresponding to the system-generated directive. The workflow storage 155 may provide (406) the appropriate workflow. In an example, the workflow may correspond to (or may be associated with an identifier for) a media portability workflow. In another example, the workflow may correspond to (or may be associated with an identifier for) a move media content workflow. The response orchestrator component 150 may determine (408) that the workflow indicates a first cross functionality component to be invoked for the pre-device directive generation point. In an example, the first cross functionality component may be a fetch task attributes component 158n. Based on this determination, the response orchestrator component 150 may invoke (410) the first cross functionality component. In some embodiments, the response orchestrator component 150 may send a canHandle( ) request to the fetch task attributes component 158n, and based on an affirmative response from the fetch task attributes component 158n, the response orchestrator component 150 may invoke the fetch task attributes component 158n. Devices participating in media playback may be tracked as "task resources." When a user request relates to media playback, the fetch task attributes component 158n is used to fetch the task resources (including one or more device identifiers) in use (i.e. outputting media content), task resources that are available for use, status of task resources, etc. The fetch task attributes 158n may send (412), to the response orchestrator component 150, data output representing attributes for task resources, where the data output is sent in response to the invocation (of step 410). The task resource attributes may be used by one or more other cross functionality components 158 and device response components 160 to generate appropriate directives. The fetch task attributes component 158n may be configured to store historical data (for an interaction session, or for multiple interaction sessions) representing usage of device resources.

Referring to FIG. 4B, the response orchestrator component 150 may determine (414), based on the workflow execution (which may be tracked by the workflow tracker 152), that the device directive generation point 306 is reached. Based on this interception point, the response orchestrator component 150 may determine (using the workflow) that a device-facing directive is to be generated, and may send (416) the system-generated directive to a device directive cross functionality component 158o. Based on the system-generated directive, the device directive cross functionality component 158o may generate (420) a device-facing directive and determine a device response component 160 to invoke. The device directive cross functionality component 158o may invoke one or more device response components 160 to determine the device component 162 to include/identify in the device directive. The device directive cross functionality component 158o may send (422) data output to the response orchestrator component 150, where the data output may include the device-facing directive and an indication of the device response component 160 to be invoked. In an example, the device response component to be invoked may be a synchronized media controller 160*m*.

The response orchestrator component 150 may determine (424) based on the workflow execution, that the post-device directive generation point 308 is reached. Based on this interception point, the response orchestrator component 150 may invoke (426) a directive handler cross functionality component 158*p*, where this invocation may include an indication of the device response component 160. The directive handler cross functionality component 158*p* may invoke (428) the synchronized media controller device response component 160*m* determined by the device directive cross functionality component 158*o*.

In some embodiments, the workflow may indicate an execution condition that another cross functionality component, for example, a media rendering component 158*t* is to be invoked based on the synchronized media controller 160*m* being invoked. Additionally, the workflow may indicate that the synchronized media controller 160*m* may be invoked in parallel with the media rendering component 158*t*. The media rendering component 158*t* may correlate directives sent to the device 110 with events received by the system 120. The synchronized media controller 160*m* may enable media playback on more than one device 110, and may generate device-facing directives that enable such playback.

In some embodiments, the media rendering component 158*t* may be invoked when other components are invoked, such as an audio player device response component 160*l* and an external media player device response component 160*o*. Such execution conditions may be indicated in the workflow, in the definition of the media rendering component 158*t*, in the definition of the device response components 160*l*, 160*o*, and/or in other stored data.

FIGS. 5A-5B illustrate an example signal flow for facilitating a dynamic grouping interaction where a device(s) is added or removed from group playback. The skill system 125 may send (502), to the response orchestrator component 150 (via the device controller component 145 and in some cases the skill handler component 190), a system generated directive to add/drop a device(s) from group playback. The response orchestrator component 150 may retrieve (504) a workflow corresponding to the system-generated directive. The workflow storage 155 may provide (506) the appropriate workflow. In an example, the workflow may correspond to (or may be associated with an identifier for) a media portability workflow. In another example, the workflow may correspond to (or may be associated with an identifier for) a dynamic group playback workflow. The response orchestrator component 150 may determine (508) that the workflow indicates a first cross functionality component to be invoked for the pre-device directive generation point. In an example, the first cross functionality component may be a fetch task attributes component 158*n*. Based on this determination, the response orchestrator component 150 may invoke (510) the first cross functionality component. In some embodiments, the response orchestrator component 150 may send a canHandle( ) request to the fetch task attributes component 158*n*, and based on an affirmative response from the fetch task attributes component 158*n*, the response orchestrator component 150 may invoke the fetch task attributes component 158*n*. In this manner, the cross functionality of the fetch task attributes component 158*n* can be invoked during different workflows. The fetch task attributes component 158*n* may send (512), to the response orchestrator component 150, data output representing attributes for task resources, where the data output is sent in response to the invocation (of step 510). The task resource attributes may be used by one or more other cross functionality components 158 and device response components 160 to generate appropriate directives. The response orchestrator component 150 may determine (514), from the workflow, additional cross functionality components 158 to invoke based on interception points (examples shown in FIG. 3) of the workflow execution. For example, the response orchestrator component 150 may invoke the device directive cross functionality component 158*o*, the directive handler cross functionality component 158*p*, the media rendering component 158*t*, etc. FIGS. 5A and 5B do not illustrate the signals for invoking the additional cross functionality components 158, but it should be understood that the cross functionality components 158 may be invoked as described herein.

Referring to FIG. 5B, the response orchestrator component 150 may determine (516), based on workflow execution, that the directive dispatch point 310 is reached. Based on this determination, the response orchestrator component 150 may invoke (518) a directive dispatch cross functionality component 158*q*. The directive dispatch cross functionality component 158*q* may dispatch (520) a device-facing directive (which may be determined by a device response component 160) to the outbound gateway 170 for the device 110, where the dispatched directive may include one or more device identifiers that are to be included in the updated group playback. The directive dispatch cross functionality component 158*q* may send (522) data output to the response orchestrator component 150, where the data output may indicate that the directive is dispatched to the device 110. At this point, the response orchestrator component 150 may determine (524), from the workflow, additional cross functionality components to invoke at the post-directive dispatch point 312, and the response orchestrator component 150 may invoke (526) additional cross functionality component(s) 158*z*. For example, the response orchestrator component 150 may invoke the media rendering component 158*t* to correlate directives dispatched to the device 110 with events received by the system 120.

In this manner, individual cross functionality components may be invoked during different workflows regardless of the device response components invoked, the system-generated directive, the device-facing directive, etc. The cross functionality components can be invoked based on execution conditions that may relate to which component is invoked and/or which interception point in the workflow is reached.

Another example interaction enabled using the runtime service component 140 is natural turn taking (NTT), which enables a user to interact with the device 110/the system 120 in a wakeword-free manner (without the use of a wakeword). Processing for NTT involves a combination of user face tracking, voice activity detection, and determining receipt of device-directed speech. Instead of determining that captured speech includes a wakeword, the device 110 may determine that the speech is directed to the device 110/the system 120, and the device may use a system directed input detector (e.g., system directed input detector 685 described below in relation to FIG. 7), rather than a wakeword detection component to do so. In example implementations, a first spoken input may include a wakeword, and subsequent spoken inputs (which may follow a system response/output) may not include a wakeword. In some embodiments, a NTT mode may always be on, and the NTT mode may be turned off/disabled when silence from the user is detected or an incompatible experience is detected (e.g., the user ends the interaction, the captured speech is not device-directed, the interaction is a communication call, media (like a movie, music, e-book, etc.), playback is occurring, etc.). In some embodiments, multiple users may be able to interact with the device 110/the system 120 in NTT mode, while, in some cases, carrying on a conversation among themselves. The system 120 may determine when a user provides an input directed to the system using techniques described herein (e.g., face tracking, etc.).

Another example interaction enabled using the runtime service component 140 is follow-up mode, where a user is able to interact with the device 110/the system 120 without using a wakeword. In some embodiments, the user may enable (e.g., via a setting at the device, via user preferences, etc.), follow-up mode. A follow-up mode cross functionality component 158f may be configured to enable or disable follow-up mode based on device-directive(s) dispatched to the device 110. In some embodiments, follow-up mode may be enabled by default for the device 110 regardless of the user setting. In some embodiments, follow-up mode may be enabled for the device 110 when a user has enabled follow-up mode for the device 110. The follow-up mode component 158f may determine to disable follow-up mode when certain device directives are dispatched (i.e. certain actions are performed by the device), such as, for example, directives to output long-form content (e.g., a movie, a playlist, a podcast, a book, etc.), directives to initiate a phone/video call (or other communications), and certain other directives. Additionally, in some embodiments, when follow-up mode is enabled (i.e. is not disabled based on the directive) the follow-up mode component 158f may cause the device 110 to activate (open) its microphone to capture wakeword-free speech inputs from the user. The follow-up mode component 158f may activate the device microphone by sending a device-facing directive to the device 110. In some embodiments, this may involve the follow-up mode component 158f or another component to send a message (similar to a skill-generated message) to the system 120, which may cause a workflow shown in FIG. 3 to execute.

The follow-up mode component 158f may be invoked at the post-device directive generation point 308, the post-directive dispatch point 312 or the post-response execution point 314 (shown in FIG. 3) during each workflow/response path execution. When invoked at the post-response execution point 314, the follow-up mode component 158f may be invoked after all device directives related to the response have been dispatched. For example, in certain cases, a response to a user input may involve sending of multiple device directives (e.g., a device directive to stop an audio player component 162a and a device directive to activate another device component 162b; a device directive to activate an audio player component 162a and a device directive to activate a display interface component 162b; etc.), and the follow-up mode component 158f may be invoked after all the device directives are sent. In such cases, any of the dispatched device directives may contribute to the enabling or disabling of the follow-up mode.

One of the cross functionality components may be a directive sequencing component 158h, which may be configured to support sequencing of directives dispatched to the device 110. This may be helpful in cases where audio outputs and visual outputs are to be synchronized. For example, the device 110 is to display product information using cards and output synthesized speech. In some cases, the cards may be updated at the device 110 before the synthesized speech has been rendered. The directive sequencing component 158h may determine an appropriate sequence for dispatching the directives to the device 110 so that audio outputs and visual outputs are presented in an appropriate manner. The directive sequencing component 158h may execute at the post-device directive generation point 308 (shown in FIG. 3).

Another cross functionality component may be an endpoint activation component 158i that may cause the device 110 to be activated before dispatching a directive to the device 110. The endpoint activation component 158i may execute at the post-device directive generation point 308.

Another cross functionality component may be endpoint switching 158k that may enable a first directive to be sent to a first device 110a, and a subsequent directive to be sent to a second device 110b, both devices 110a, 110b being associated with the same user profile or household.

Another cross functionality component may be adaptive volume control 158j that may automatically adjust a volume of the device 110 if audio-based directives are sent to the device 110.

The following is a general description of possible components of the system 120 and device 110. The various components of the system 120 may be located on a same or different physical devices. Communication between various components may occur directly or across a network(s) 199.

A microphone or array of microphones (of or otherwise associated with a device 110) may capture audio 107 (illustrated in FIG. 1). The device 110 processes audio data 611 (illustrated in FIG. 6), representing the audio, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data, the energy levels of the audio data in one or more spectral bands, the signal-to-noise ratios of the audio data in one or more spectral bands, or other quantitative aspects. In other examples, the device 110 may implement a classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in the audio data 611 representing the audio 107, the device 110 may determine if the speech is directed at the device 110/system 120. In at least some embodiments, such determination may be made using a wakeword detection component 620 (shown in FIG. 6). The wakeword detection component 620 may be configured to detect various wakewords. In at least some examples, each wakeword may correspond to a name of a different digital assistant. An example wakeword/digital assistant name is "Alexa."

Wakeword detection is typically performed without performing linguistic analysis, textual analysis, or semantic analysis. Instead, the audio data 611, representing the audio, is analyzed to determine if specific characteristics of the audio data 611 match preconfigured acoustic waveforms, audio signatures, or other data corresponding to a wakeword.

Thus, the wakeword detection component 620 may compare the audio data 611 to stored data to detect a wakeword.

One approach for wakeword detection applies general large vocabulary continuous speech recognition (LVCSR) systems to decode audio signals, with wakeword searching being conducted in the resulting lattices or confusion networks. Another approach for wakeword detection builds HMIs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 620 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

In various embodiments, the device 110 may behave differently depending on which wakeword is used. For example, in a multi-user environment, different users may use different wakewords, and the device 110 may tailor its operation in response to a particular user/wakeword matching. The device 110 may, for example, access a user profile associated with a particular wakeword and load device preferences or device usage history stored in the user profile. In other embodiments, a first wakeword may be associated with a first mode of operation of the device 110 and a second wakeword may be associated with a second mode of operation of the device 110. The first mode of operation may be, for example, a personal assistant, and the second mode of operation may be navigation (such as automobile navigation).

In another example the device 110 may be configured to process commands associated with a first wakeword using a different set of components than commands associated with a second wakeword. For example, if an utterance includes the wakeword "Alexa," audio data for that wakeword may be sent to a first speech processing system for speech processing and/or command execution. If an utterance includes the wakeword "Ok Google," audio data for that wakeword may be sent to a second speech processing system for speech processing and/or command execution. In another example the system may also use different wakewords for different skills within a same speech processing system. For example, a user may speak "Ford" as a special wakeword to invoke a specific skill or processing pipeline within a first speech processing system (e.g., a speech processing system that may otherwise be invoked by speaking "Alexa"). Use of the special "Ford" wakeword may result in different routing of the utterance through the first speech processing system than use of a standard wakeword such as "Alexa." Thus the device 110 using the techniques described herein may process incoming audio to determine a first confidence that a detected wakeword is a first wakeword associated with a first speech processing pipeline (which may be a first speech processing system or a first pipeline (e.g., skill, etc.) within the first speech processing system) as well as determine a second confidence that the detected wakeword is a second wakeword associated with a second speech processing pipeline (which may be a second speech processing system or a second, different, pipeline (e.g., skill, etc.) within the second speech processing system. The different systems/pipelines may be associated with different ASR processing, different NLU processing, different commands/intents, or other differences.

In some embodiments, wakeword-free interactions may be enabled, in which case, the device 110 (or the system 120) may determine whether a user input (e.g., a spoken input) is a system-directed input. Such determination may be made using a system-directed input detection component 685, details of which are described below in relation to FIG. 7.

Once the wakeword detection component 620 detects a wakeword, the device 110 may "wake" and begin transmitting the audio data 611, representing the audio, to the system 120 (e.g., step 1 in FIG. 1). The audio data 611 may include data corresponding to the detected wakeword, or the device 110 may remove the portion of the audio corresponding to the detected wakeword prior to sending the audio data 611 to the system 120.

The orchestrator component 130 may receive the audio data 611 from the device 110, and send the audio data 611 to the ASR component 250. As described above, the system 120 may perform speech processing using two different components (e.g., the ASR component 250 and the NLU component 260). In at least some embodiments, the system 120 may implement a spoken language understanding (SLU) component configured to process audio data to determine NLU output data.

The SLU component may be equivalent to a combination of the ASR component 250 and the NLU component 260. Yet, the SLU component may process audio data and directly determine the NLU output data, without an intermediate step of generating ASR output data. As such, the SLU component may take audio data representing speech and attempt to make a semantic interpretation of the speech. That is, the SLU component may determine a meaning associated with the speech and then implement that meaning. For example, the SLU component may interpret audio data representing speech from the user 105 in order to derive a desired action. The SLU component may output NLU output data including a most likely NLU hypothesis, or multiple NLU hypotheses associated with respective confidence or other scores (such as probability scores, etc.).

The foregoing describes illustrative components and processing of the system 120. The following describes illustrative components and processing of the device 110. As illustrated in FIG. 6, in at least some embodiments the system 120 may receive the audio data 611 from the device 110, to recognize speech in the received audio data 611, and to perform functions in response to the recognized speech. In at least some embodiments, these functions involve sending directives (e.g., commands), from the system 120 to the device 110 to cause the device 110 to perform an action, such as output synthesized speech (responsive to the spoken user input) via a loudspeaker(s), and/or control one or more secondary devices by sending control commands to the one or more secondary devices.

Thus, when the device 110 is able to communicate with the system 120 over the network(s) 199, some or all of the functions capable of being performed by the system 120 may be performed by sending one or more directives over the network(s) 199 to the device 110, which, in turn, may process the directive(s) and perform one or more corresponding actions. For example, the system 120, using a remote directive that is included in response data (e.g., a remote response), may instruct the device 110 to output synthesized speech via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It will be appreciated that the system 120 may be configured to provide other functions in addition to those discussed herein, such as, without limitation, providing step-by-step directions for navigating from an origin location to a destination location, conducting an electronic commerce transaction on behalf of the user 105 as part of a shopping function, establishing a communication session (e.g., an audio or video call) between the user 105 and another user, and so on.

As noted previously, the device 110 may include a wakeword detection component 620 configured to used to detect a wakeword (e.g., "Alexa") that indicates to the device 110 that the audio data 611 is to be processed for determining NLU output data. In at least some embodiments, a hybrid selector 624, of the device 110, may send the audio data 611 to the wakeword detection component 620. If the wakeword detection component 620 detects a wakeword in the audio data 611, the wakeword detection component 620 may send an indication of such detection to the hybrid selector 624. In response to receiving the indication, the hybrid selector 624 may send the audio data 611 to the system 120 and/or an ASR component 650 implemented by the device 110. The wakeword detection component 620 may also send an indication, to the hybrid selector 624, representing a wakeword was not detected. In response to receiving such an indication, the hybrid selector 624 may refrain from sending the audio data 611 to the system 120, and may prevent the ASR component 650 from processing the audio data 611. In this situation, the audio data 611 can be discarded.

The device 110 may conduct its own speech processing using on-device language processing components (the ASR component 650, and/or a NLU component 660) similar to the manner discussed above with respect to the system-implemented ASR component 250, and NLU component 260. The device 110 may also internally include, or otherwise have access to, other components such as one or more skills 125, a user recognition component 695 (configured to process in a similar manner to the user recognition component 295 implemented by the system 120), a profile storage 670 (configured to store similar profile data to the profile storage 270 implemented by the system 120), a TTS component (configured to perform text-to-speech processing), and/or other components. In at least some embodiments, the profile storage 670 may only store profile data for a user or group of users specifically associated with the device 110.

In at least some embodiments, the on-device language processing components may not have the same capabilities as the language processing components implemented by the system 120. For example, the on-device language processing components may be configured to handle only a subset of the user inputs that may be handled by the system-implemented language processing components. For example, such subset of user inputs may correspond to local-type user inputs, such as those controlling devices or components associated with a user's home. In such circumstances the on-device language processing components may be able to more quickly interpret and respond to a local-type user input, for example, than processing that involves the system 120. If the device 110 attempts to process a user input for which the on-device language processing components are not necessarily best suited, the NLU output data, determined by the on-device components, may have a low confidence or other metric indicating that the processing by the on-device language processing components may not be as accurate as the processing done by the system 120.

The hybrid selector 624, of the device 110, may include a hybrid proxy (HP) 626 configured to proxy traffic to/from the system 120. For example, the HP 626 may be configured to send messages to/from a hybrid execution controller (HEC) 627 of the hybrid selector 624. For example, command/directive data received from the system 120 can be sent to the HEC 627 using the HP 626. The HP 626 may also be configured to allow the audio data 611 to pass to the system 120 while also receiving (e.g., intercepting) this audio data 611 and sending the audio data 611 to the HEC 627.

In at least some embodiments, the hybrid selector 624 may further include a local request orchestrator (LRO) 628 configured to notify the ASR component 650 about the availability of the audio data 611, and to otherwise initiate the operations of on-device language processing when the audio data 611 becomes available. In general, the hybrid selector 624 may control execution of on-device language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system 120 and chooses to use that remotely-determined directive data.

Thus, when the audio data 611 is received, the HP 626 may allow the audio data 611 to pass through to the system 120 and the HP 626 may also input the audio data 611 to the ASR component 650 by routing the audio data 611 through the HEC 627 of the hybrid selector 624, whereby the LRO 628 notifies the ASR component 650 of the audio data 611. At this point, the hybrid selector 624 may wait for response data from either or both the system 120 and/or the on-device language processing components. However, the disclosure is not limited thereto, and in some examples the hybrid selector 624 may send the audio data 611 only to the ASR component 650 without departing from the disclosure. For example, the device 110 may process the audio data 611 on-device without sending the audio data 611 to the system 120.

The ASR component 650 is configured to receive the audio data 611 from the hybrid selector 624, and to recognize speech in the audio data 611, and the NLU component 660 is configured to determine an intent from the recognized speech (an optionally one or more named entities), and to determine how to act on the intent by generating directive data (e.g., instructing a component to perform an action). In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

NLU output data (output by the NLU component 660) may be selected as usable to respond to a user input, and local response data may be sent to the hybrid selector 624, such as a "ReadyToExecute" response. The hybrid selector 624 may then determine whether to use directive data from the on-device components to respond to the user input, to use directive data received from the runtime service 140, assuming a remote response is even received (e.g., when the device 110 is able to access the system 120 over the network(s) 199), or to determine output data requesting additional information from the user 105.

The device 110 and/or the system 120 may associate a unique identifier with each user input. The device 110 may include the unique identifier when sending the audio data 611 to the system 120, and the response data from the system 120 may include the unique identifier to identify to which user input the response data corresponds.

In at least some embodiments, the device 110 may include one or more skills 125 that may process similarly to the system-implemented skill(s) 125. The skill(s) 125 installed on (or in communication with) the device 110 may include, without limitation, a smart home skill and/or a device control skill configured to control a second device(s), a music skill configured to output music, a navigation skill configured to output directions, a shopping skill configured to conduct an electronic purchase, and/or the like.

Configuration and operation of the system directed input detector 685 is illustrated in FIG. 7. The system directed input detector 685 may be included on the device 110 as shown in FIG. 6. In some embodiments, a system directed input detector (configured to process similar to the system directed input detector 685) may be included at the system 120. As shown in FIG. 7, the system directed input detector 685 may include a number of different components. First, the system directed input detector 685 may include a voice activity detector (VAD) 720. The VAD 720 may operate to detect whether the incoming audio data 611 includes speech or not. The VAD output 721 may be a binary indicator. Thus, if the incoming audio data 611 includes speech, the VAD 720 may output an indicator 721 that the audio data 611 does includes speech (e.g., a 1) and if the incoming audio data 611 does not includes speech, the VAD 720 may output an indicator 721 that the audio data 611 does not includes speech (e.g., a 0). The VAD output 721 may also be a score (e.g., a number between 0 and 1) corresponding to a likelihood that the audio data 611 includes speech. The VAD 720 may also perform start-point detection as well as end-point detection where the VAD 720 determines when speech starts in the audio data 611 and when it ends in the audio data 611. Thus the VAD output 721 may also include indicators of a speech start point and/or a speech endpoint for use by other components of the system. (For example, the start-point and end-points may demarcate the audio data 611 that is sent to the speech processing component 240.) The VAD output 721 may be associated with a same unique ID as the audio data 611 for purposes of tracking system processing across various components.

The VAD 720 may operate using a variety of VAD techniques, including those described above with regard to VAD operations performed by device 110. The VAD may be configured to be robust to background noise so as to accurately detect when audio data actually includes speech or not. The VAD 720 may operate on raw audio data 611 such as that sent by device 110 or may operate on feature vectors or other data representing the audio data 611. For example, the VAD 720 may take the form of a deep neural network (DNN) and may operate on a single feature vector representing the entirety of audio data 611 received from the device or may operate on multiple feature vectors, for example feature vectors representing frames of audio data where each frame covers a certain amount of time of audio data (e.g., 25 ms). The VAD 720 may also operate on other data 781 that may be useful in detecting voice activity in the audio data 611. For example, the other data 781 may include results of anchored speech detection where the system takes a representation (such as a voice fingerprint, reference feature vector, etc.) of a reference section of speech (such as speech of a voice that uttered a previous command to the system that included a wakeword) and compares a voice detected in the audio data 611 to determine if that voice matches a voice in the reference section of speech. If the voices match, that may be an indicator to the VAD 720 that speech was detected. If not, that may be an indicator to the VAD 720 that speech was not detected. (For example, a representation may be taken of voice data in the first input audio data which may then be compared to the second input audio data to see if the voices match. If they do (or do not) that information may be considered by the VAD 720.) The VAD 720 may also consider other data when determining if speech was detected. The VAD 720 may also consider speaker ID information (such as may be output by user recognition component 295), directionality data that may indicate what direction (relative to the capture device 110) the incoming audio was received from. Such directionality data may be received from the device 110 and may have been determined by a beamformer or other component of device 110. The VAD 720 may also consider data regarding a previous utterance which may indicate whether the further audio data received by the system is likely to include speech. Other VAD techniques may also be used.

If the VAD output 721 indicates that no speech was detected the system (through orchestrator 130 or some other component) may discontinue processing with regard to the audio data 611, thus saving computing resources that might otherwise have been spent on other processes (e.g., ASR for the audio data 611, etc.). If the VAD output 721 indicates that speech was detected, the system may make a determination as to whether the speech was or was not directed to the speech-processing system. Such a determination may be made by the system directed audio detector 740. The system directed audio detector 740 may include a trained model, such as a DNN, that operates on a feature vector which represent certain data that may be useful in determining whether or not speech is directed to the system. To create the feature vector operable by the system directed audio detector 740, a feature extractor 730 may be used. The feature extractor 730 may input ASR results 710 which include results from the processing of the audio data 611 by the ASR component 250. For privacy protection purposes, in certain configurations the ASR results 710 may be obtained from the ASR component 650 located on device 110 or on a home remote component as opposed to the ASR component 250 located on a cloud or other remote system 120 so that audio data 611 is not sent remote from the user's home unless the system directed input detector component 685 has determined that the input is system directed. Though this may be adjusted depending on user preferences/system configuration.

The ASR results 710 may include an N-best list of top scoring ASR hypotheses and their corresponding scores, portions (or all of) an ASR lattice/trellis with scores, portions (or all of) an ASR search graph with scores, portions (or all of) an ASR confusion network with scores, or other such ASR output. As an example, the ASR results 710 may include a trellis, which may include a raw search graph as scored during ASR decoding. The ASR results 710 may also include a lattice, which may be a trellis as scored that has been pruned to remove certain hypotheses that do not exceed a score threshold or number of hypotheses threshold. The ASR results 710 may also include a confusion network where paths from the lattice have been merged (e.g., merging hypotheses that may share all or a portion of a same word). The confusion network may be a data structure corresponding to a linear graph that may be used as an alternate representation of the most likely hypotheses of the decoder lattice. The ASR results 710 may also include corresponding respective scores (such as for a trellis, lattice, confusion network, individual hypothesis, N-best list, etc.)

The ASR results 710 (or other data 791) may include other ASR result related data such as other features from the ASR system or data determined by another component. For example, the system may determine an entropy of the ASR results (for example a trellis entropy or the like) that indicates a how spread apart the probability mass of the trellis is among the alternate hypotheses. A large entropy (e.g., large spread of probability mass over many hypotheses) may indicate the ASR component 250/650 being less confident about its best hypothesis, which in turn may correlate to detected speech not being device directed. The entropy may be a feature included in other data 791 to be considered by the system directed audio detector 740.

The system may also determine and consider ASR decoding costs, which may include features from Viterbi decoding costs of the ASR. Such features may indicate how well the input acoustics and vocabulary match with the acoustic models and language models implemented by the ASR component 250/650. Higher Viterbi costs may indicate greater mismatch between the model and the given data, which may correlate to detected speech not being device directed. Confusion network feature may also be used. For example, an average number of arcs (where each arc represents a word) from a particular node (representing a potential join between two words) may measure how many competing hypotheses there are in the confusion network. A large number of competing hypotheses may indicate that the ASR component 250/650 is less confident about the top hypothesis, which may correlate to detected speech not being device directed. Other such features or data from the ASR results 710 may also be used as other data 791.

The ASR results 710 may be represented in a system directed detector (SDD) feature vector 731 that can be used to determine whether speech was system-directed. The feature vector 731 may represent the ASR results 710 but may also represent audio data 611 (which may be input to feature extractor 730) or other information. Such ASR results may be helpful in determining if speech was system-directed. For example, if ASR results include a high scoring single hypothesis, that may indicate that the speech represented in the audio data 611 is directed at, and intended for, the device 110. If, however, ASR results do not include a single high scoring hypothesis, but rather many lower scoring hypotheses, that may indicate some confusion on the part of the ASR component 250/650 and may also indicate that the speech represented in the audio data 611 was not directed at, nor intended for, the device 110.

The ASR results 710 may include complete ASR results, for example ASR results corresponding to all speech between a startpoint and endpoint (such as a complete lattice, etc.). In this configuration the system may wait until all ASR processing for a certain input audio has been completed before operating the feature extractor 730 and system directed audio detector 740. Thus the system directed audio detector 740 may receive a feature vector 731 that includes all the representations of the audio data 611 created by the feature extractor 730. The system directed audio detector 740 may then operate a trained model (such as a DNN) on the feature vector 731 to determine a score corresponding to a likelihood that the audio data 611 includes a representation of system-directed speech. If the score is above a threshold, the system directed audio detector 740 may determine that the audio data 611 does include a representation of system-directed speech. The SDD result 742 may include an indicator of whether the audio data includes system-directed speech, a score, and/or some other data.

The ASR results 710 may also include incomplete ASR results, for example ASR results corresponding to only some speech between a between a startpoint and endpoint (such as an incomplete lattice, etc.). In this configuration the feature extractor 730/system directed audio detector 740 may be configured to operate on incomplete ASR results 710 and thus the system directed audio detector 740 may be configured to output an SSD result 742 that provides an indication as to whether the portion of audio data processed (that corresponds to the incomplete ASR results) corresponds to system directed speech. The system may thus be configured to perform ASR at least partially in parallel with the system directed audio detector 740 to process ASR result data as it is ready and thus continually update an SDD result 742. Once the system directed input detector 685 has processed enough ASR results and/or the SDD result 742 exceeds a threshold, the system may determine that the audio data 611 includes system-directed speech. Similarly, once the system directed input detector 685 has processed enough ASR results and/or the SDD result 742 drops below another threshold, the system may determine that the audio data 611 does not include system-directed speech.

The SDD result 742 may be associated with a same unique ID as the audio data 611 and VAD output 721 for purposes of tracking system processing across various components.

The feature extractor 730 may also incorporate in a feature vector 731 representations of other data 791. Other data 791 may include, for example, word embeddings from words output by the ASR component 250/650 may be considered. Word embeddings are vector representations of words or sequences of words that show how specific words may be used relative to other words, such as in a large text corpus. A word embedding may be of a different length depending on how many words are in a text segment represented by the word embedding. For purposes of the feature extractor 730 processing and representing a word embedding in a feature vector 731 (which may be of a fixed length), a word embedding of unknown length may be processed by a neural network with memory, such as an LSTM (long short term memory) network. Each vector of a word embedding may be processed by the LSTM which may then output a fixed representation of the input word embedding vectors.

Other data 791 may also include, for example, NLU output from the NLU component 260/660 component may be considered. Thus, if the NLU output data indicates a high correlation between the audio data 611 and an out-of-domain indication (e.g., no intent classifier scores or overall domain scores reach a certain confidence threshold), this may indicate that the audio data 611 does not include system-directed speech. Other data 791 may also include, for example, an indicator of a user/speaker as output user recognition component 295/695. Thus, for example, if the user recognition component 295/695 does not indicate the presence of a known user, or indicates the presence of a user associated with audio data 611 that was not associated with a previous utterance, this may indicate that the audio data 611 does not include system-directed speech. The other data 791 may also include an indication that a voice represented in audio data 611 is the same (or different) as the voice detected in previous input audio data corresponding to a previous utterance. The other data 791 may also include directionality data, for example using beamforming or other audio processing techniques to determine a direction/location of a source of detected speech and whether that source direction/location matches a speaking user. The other data 791 may also include data indicating that a direction of a user's speech is toward a device 110 or away from a device 110, which may indicate whether the speech was system directed or not.

Other data 791 may also include image data 712. For example, if image data is detected from one or more devices that are nearby to the device 110 (which may include the device 110 itself) that captured the audio data being processed using the system directed input detector (685), the image data may be processed to determine whether a user is facing an audio capture device for purposes of determining whether speech is system-directed as further explained below.

Other data 791 may also dialog history data. For example, the other data 791 may include information about whether a speaker has changed from a previous utterance to the current audio data 611, whether a topic of conversation has changed from a previous utterance to the current audio data, how NLU results from a previous utterance compare to NLU results obtained using the current audio data 611, other system context information. The other data 791 may also include an indicator as to whether the audio data 611 was received as a result of a wake command or whether the audio data 611 was sent without the device 110 detecting a wake command (e.g., the device 110 being instructed by remote system 120 and/or determining to send the audio data without first detecting a wake command).

Other data 791 may also include information from the user profile 270/670.

Other data 791 may also include direction data, for example data regarding a direction of arrival of speech detected by the device, for example a beam index number, angle data, or the like. If second audio data is received from a different direction than first audio data, then the system may be less likely to declare the second audio data to include system-directed speech since it is originating from a different location.

Other data 791 may also include acoustic feature data such as pitch, prosody, intonation, volume, or other data descriptive of the speech in the audio data 611. As a user may use a different vocal tone to speak with a machine than with another human, acoustic feature information may be useful in determining if speech is device-directed.

Other data 791 may also include an indicator that indicates whether the audio data 611 includes a wakeword. For example, if a device 110 detects a wakeword prior to sending the audio data 611 to the remote system 120, the device 110 may send along an indicator that the device 110 detected a wakeword in the audio data 611. In another example, the remote system 120 may include another component that processes incoming audio data 611 to determine if it includes a wakeword. If it does, the component may create an indicator indicating that the audio data 611 includes a wakeword. The indicator may then be included in other data 791 to be incorporated in the feature vector 731 and/or otherwise considered by the system directed audio detector 740.

Other data 791 may also include device history data such as information about previous operations related to the device 110 that sent the audio data 611. For example, the other data 791 may include information about a previous utterance that was just executed, where the utterance originated with the same device 110 as a current utterance and the previous utterance was within a certain time window of the current utterance. Device history data may be stored in a manner associated with the device identifier (which may also be included in other data 791), which may also be used to track other information about the device, such as device hardware, capability, location, etc.

The other data 781 used by the VAD 720 may include similar data and/or different data from the other data 791 used by the feature extractor 730. The other data 781/791 may thus include a variety of data corresponding to input audio from a previous utterance. That data may include acoustic data from a previous utterance, speaker ID/voice identification data from a previous utterance, information about the time between a previous utterance and a current utterance, or a variety of other data described herein taken from a previous utterance. A score threshold (for the system directed audio detector 740 and/or the VAD 720) may be based on the data from the previous utterance. For example, a score threshold (for the system directed audio detector 740 and/or the VAD 720) may be based on acoustic data from a previous utterance.

The feature extractor 730 may output a single feature vector 731 for one utterance/instance of input audio data 611. The feature vector 731 may consistently be a fixed length, or may be a variable length vector depending on the relevant data available for particular audio data 611. Thus, the system directed audio detector 740 may output a single SDD result 742 per utterance/instance of input audio data 611. The SDD result 742 may be a binary indicator. Thus, if the incoming audio data 611 includes system-directed speech, the system directed audio detector 740 may output an indicator 742 that the audio data 611 does includes system-directed speech (e.g., a 1) and if the incoming audio data 611 does not includes system-directed speech, the system directed audio detector 740 may output an indicator 742 that the audio data 611 does not system-directed includes speech (e.g., a 0). The SDD result 742 may also be a score (e.g., a number between 0 and 1) corresponding to a likelihood that the audio data 611 includes system-directed speech. Although not illustrated in FIG. 7, the flow of data to and from the system directed input detector 685 may be managed by the orchestrator 130 or by one or more other components.

The trained model(s) of the system directed audio detector 740 may be trained on many different examples of SDD feature vectors that include both positive and negative training samples (e.g., samples that both represent system-directed speech and non-system directed speech) so that the DNN and/or other trained model of the system directed audio detector 740 may be capable of robustly detecting when speech is system-directed versus when speech is not system-directed.

A further input to the system directed input detector 685 may include output data from a TTS component to avoid synthesized speech output by the system being confused as system-directed speech spoken by a user. The output from the TTS component may allow the system to ignore synthesized speech in its considerations of whether speech was system directed. The output from the TTS component may also allow the system to determine whether a user captured utterance is responsive to the TTS output, thus improving system operation.

The system directed input detector 685 may also use echo return loss enhancement (ERLE) and/or acoustic echo cancellation (AEC) data to avoid processing of audio data generated by the system.

As shown in FIG. 7, the system directed input detector 685 may simply user audio data to determine whether an input is system directed (for example, system directed audio detector 740 may output an SDD result 742). This may be true particularly when no image data is available (for example for a device without a camera). If image data 712 is available, however, the system may also be configured to use image data 712 to determine if an input is system directed. The image data 712 may include image data captured by device 110 and/or image data captured by other device(s) in the environment of device 110. The audio data 611, image data 712 and other data 781 may be timestamped or otherwise correlated so that the system directed input detector 685 may determine that the data being analyzed all relates to a same time window so as to ensure alignment of data considered with regard to whether a particular input is system directed. For example, the system directed input detector 685 may determine system directedness scores for every frame of audio data/every image of a video stream and may align and/or window them to determine a single overall score for a particular input that corresponds to a group of audio frames/images.

Image data 712 along with other data 781 may be received by feature extractor 735. The feature extractor may create one or more feature vectors 736 which may represent the image data 712/other data 781. In certain examples, other data 781 may include data from an image processing component, which may include information about faces, gesture, etc. detected in the image data 712. For privacy protection purposes, in certain configurations any image processing/results thereof may be obtained from an image processing component located on device 110 or on a home remote component as opposed to a image processing component located on a cloud or the system 120 so that image data 712 is not sent remote from the user's home unless the system directed input detector component 685 has determined that the input is system directed. Though this may be adjusted depending on user preferences/system configuration.

The feature vector 736 may be passed to the user detector 725. The user detector 725 (which may use various components/operations of the user recognition component 295/695, etc.) may be configured to process image data 712 and/or feature vector 736 to determine information about the user's behavior which in turn may be used to determine if an input is system directed. For example, the user detector 725 may be configured to determine the user's position/behavior with respect to device 110/system 100. The user detector 725 may also be configured to determine whether a user's mouth is opening/closing in a manner that suggests the user is speaking. The user detector 725 may also be configured to determine whether a user is nodding or shaking his/her head. The user detector 725 may also be configured to determine whether a user's gaze is directed to the device 110, to another user, or to another object. For example, the use detector 725 may include, or be configured to use data from, a gaze detector. The user detector 725 may also be configured to determine gestures of the user such as a shoulder shrug, pointing toward an object, a wave, a hand up to indicate an instruction to stop, or a fingers moving to indicate an instruction to continue, holding up a certain number of fingers, putting a thumb up, etc. The user detector 725 may also be configured to determine a user's position/orientation such as facing another user, facing the device 110, whether their back is turned, etc. The user detector 725 may also be configured to determine relative positions of multiple users that appear in image data (and/or are speaking in audio data 611 which may also be considered by the user detector 725 along with feature vector 731), for example which users are closer to a device 110 and which are farther away. The user detector 725 (and/or other component) may also be configured to identify other objects represented in image data and determine whether objects are relevant to a dialog or system interaction (for example determining if a user is referring to an object through a movement or speech).

The user detector 725 may operate one or more models (e.g., one or more classifiers) to determine if certain situations are represented in the image data 712. For example the user detector 725 may employ a visual directedness classifier that may determine, for each face detected in the image data 712 whether that face is looking at the device 110 or not. For example, a light-weight convolutional neural network (CNN) may be used which takes a face image cropped from the result of the face detector as input and output a [0,1] score of how likely the face is directed to the camera or not. Another technique may include to determine a three-dimensional (3D) landmark of each face, estimate the 3D angle of the face and predict a directness score based on the 3D angle.

The user detector 725 may be configured to track a face in image data to determine which faces represented may belong to a same person. The system may user IOU based tracker, a mean-shift based tracker, a particle filter based tracker or other technique.

The user detector 725 (or other component(s) such as those in user recognition component 295/695) may be configured to determine whether a face represented in image data belongs to a person who is speaking or not, thus performing active speaker detection. The system may take the output from the face tracker and aggregate a sequence of face from the same person as input and predict whether this person is speaking or not. Lip motion, user ID, detected voice data, and other data may be used to determine whether a user is speaking or not.

The system directed image detector 750 may then determine, based on information from the user detector 725 as based on the image data whether an input relating to the image data is system directed. The system directed image detector 750 may also operate on other input data, for example image data including raw image data 712, image data including feature data 736 based on raw image data, other data 781, or other data. The determination by the system directed image detector 750 may result in a score indicating whether the input is system directed based on the image data. If no audio data is available, the indication may be output as SDD result 742. If audio data is available, the indication may be sent to system directed detector 770 which may consider information from both system directed audio detector 740 and system directed image detector 750. The system directed detector 770 may then process the data from both system directed audio detector 740 and system directed image detector 750 to come up with an overall determination as to whether an input was system directed, which may be output as SDD result 742. The system directed detector 770 may consider not only data output from system directed audio detector 740 and system directed image detector 750 but also other data/metadata corresponding to the input (for example, image data/feature data 736, audio data/feature data 731, image data 712, audio data 611, or the like discussed with regard to FIG. 7. The system directed detector 770 may include one or more models which may analyze the various input data to make a determination regarding SDD result 742.

In one example the determination of the system directed detector 770 may be based on "AND" logic, for example determining an input is system directed only if affirmative data is received from both system directed audio detector 740 and system directed image detector 750. In another example the determination of the system directed detector 770 may be based on "OR" logic, for example determining an input is system directed if affirmative data is received from either system directed audio detector 740 or system directed image detector 750. In another example the data received from system directed audio detector 740 and system directed image detector 750 are weighted individually based on other information available to system directed detector 770 to determine to what extend audio and/or image data should impact the decision of whether an input is system directed.

The system directed input detector 685 may also receive information from a wakeword component 620. For example, an indication that a wakeword was detected (e.g., WW data 744) may be considered by the system directed input detector 685 (e.g., by system directed audio detector 740, system directed detector 770, etc.) as part of the overall consideration of whether a system input was device directed. Detection of a wakeword may be considered a strong signal that a particular input was device directed.

If an input is determined to be system directed, the data related to the input may be sent to downstream components, on the device 110 and/or on the system 120, for further processing (e.g., to ASR component 250/650). If an input is determined not to be system directed, the system may take no further action regarding the data related to the input and may allow it to be deleted. In certain configurations, to maintain privacy, the operations to determine whether an input is system directed are performed by device 110 (or home server(s) 120) and only if the input is determined to be system directed is further data (such as audio data 611 or image data 712) sent to a remote system 120 that is outside a user's home or other direct control.

Figure 8:
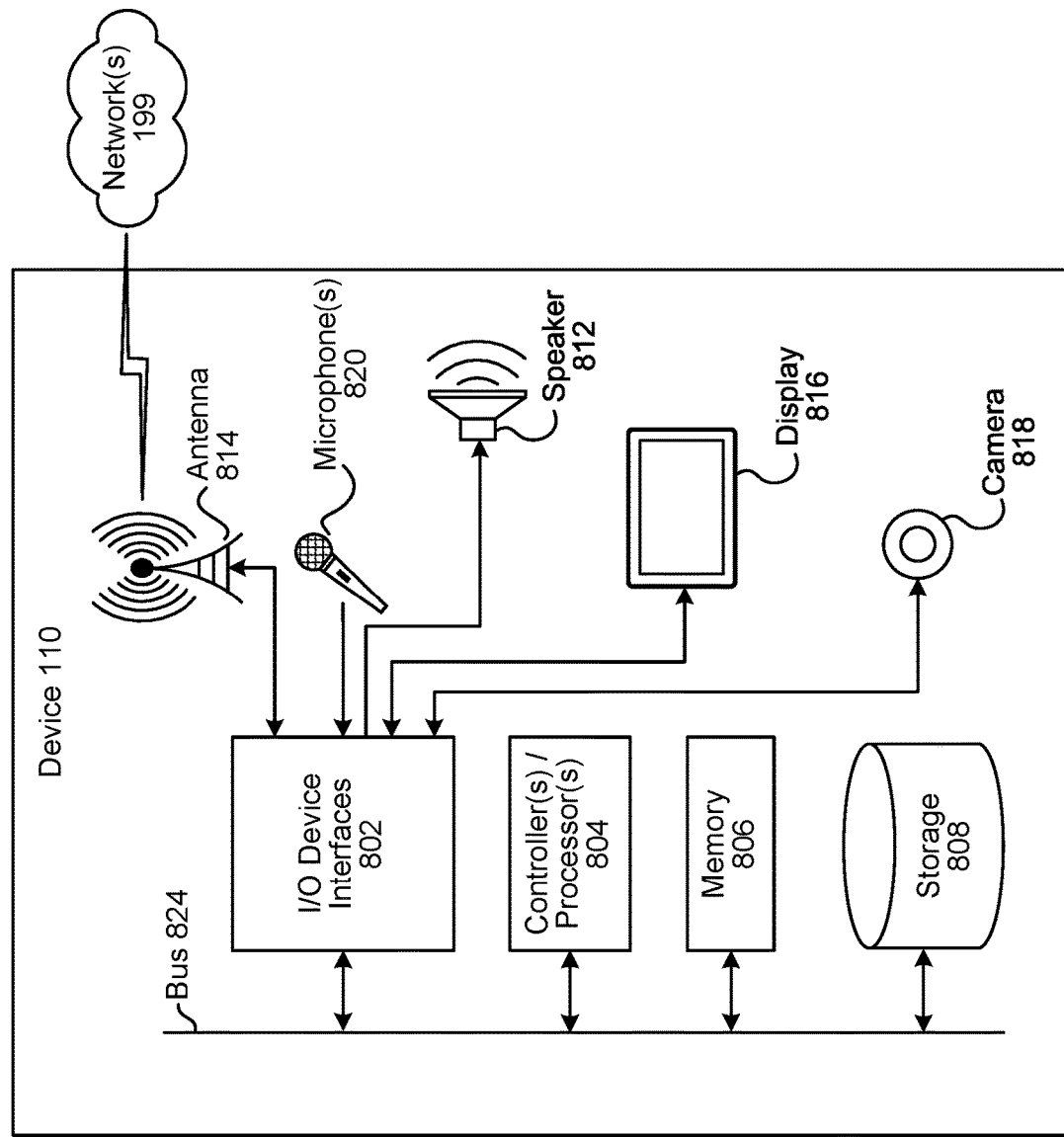
FIG. 8 is a block diagram conceptually illustrating example components of a device, according to embodiments of the present disclosure.
Figure 9:
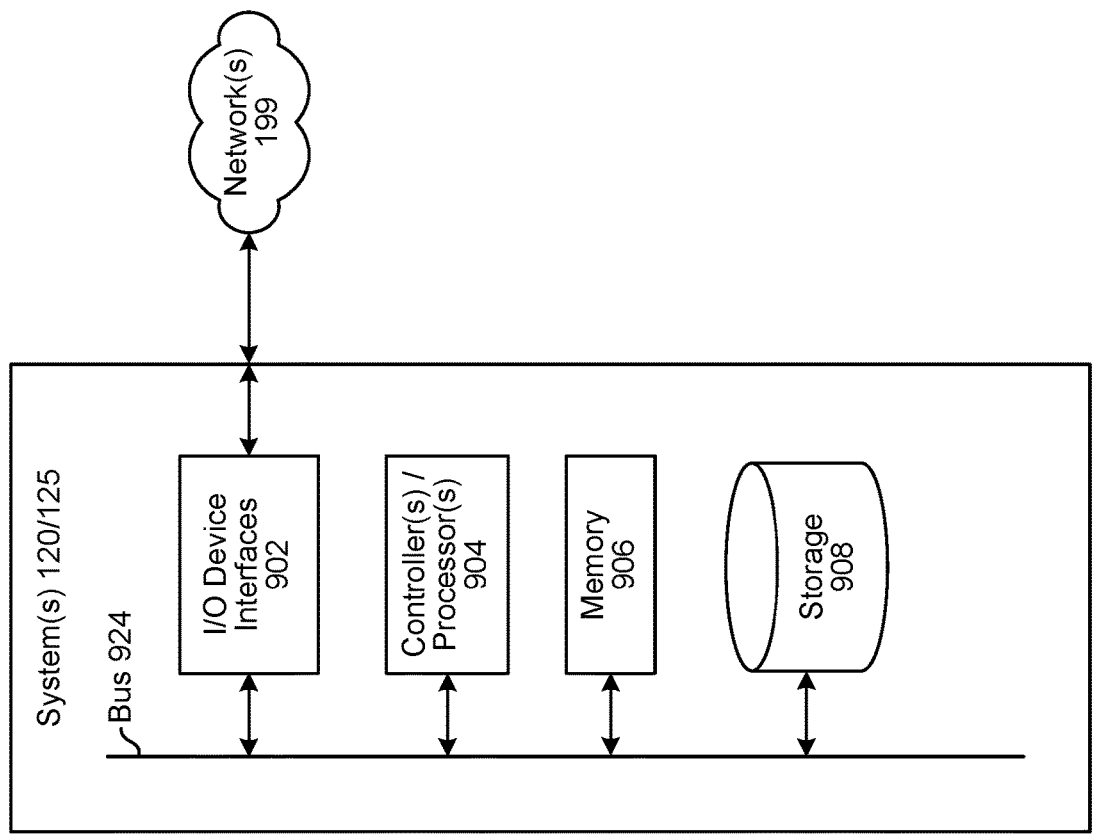
FIG. 9 is a block diagram conceptually illustrating example components of a system, according to embodiments of the present disclosure.

FIG. 8 is a block diagram conceptually illustrating a device 110 that may be used with the system 120. FIG. 9 is a block diagram conceptually illustrating example components of a remote device, such as the system 120, which may assist with ASR processing, NLU processing, etc.; and a skill system 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system 120 may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the system 100 of the present disclosure, such as one or more systems 120 for performing ASR processing, one or more systems 120 for performing NLU processing, and one or more skill 125, etc. In operation, each of these systems may include computer-readable and computer-executable instructions that reside on the respective device (120/125), as will be discussed further below.

Each of these devices (110/120/125) may include one or more controllers/processors (804/904), which may each include a central processing unit (CPU) for processing data and computer-readable instructions, and a memory (806/906) for storing data and instructions of the respective device. The memories (806/906) may individually include volatile random access memory (RAM), non-volatile read only memory (ROM), non-volatile magnetoresistive memory (MRAM), and/or other types of memory. Each device (110/120/125) may also include a data storage component (808/908) for storing data and controller/processor-executable instructions. Each data storage component (808/908) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (802/902).

Computer instructions for operating each device (110/120/125) and its various components may be executed by the respective device's controller(s)/processor(s) (804/904), using the memory (806/906) as temporary "working" storage at runtime. A device's computer instructions may be stored in a non-transitory manner in non-volatile memory (806/906), storage (808/908), or an external device(s). Alternatively, some or all of the executable instructions may be embedded in hardware or firmware on the respective device in addition to or instead of software.

Each device (110/120/125) includes input/output device interfaces (802/902). A variety of components may be connected through the input/output device interfaces (802/902), as will be discussed further below. Additionally, each device (110/120/125) may include an address/data bus (824/924) for conveying data among components of the respective device. Each component within a device (110/120/125) may also be directly connected to other components in addition to (or instead of) being connected to other components across the bus (824/924).

Referring to FIG. 8, the device 110 may include input/output device interfaces 802 that connect to a variety of components such as an audio output component such as a speaker 812, a wired headset or a wireless headset (not illustrated), or other component capable of outputting audio. The device 110 may also include an audio capture component. The audio capture component may be, for example, a microphone 820 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 816 for displaying content. The device 110 may further include a camera 818.

Via antenna(s) 814, the input/output device interfaces 802 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (802/902) may also include communication components that allow data to be exchanged between devices such as different physical servers in a collection of servers or other components.

The components of the device 110, the system 120, and/or a skill 125 may include their own dedicated processors, memory, and/or storage. Alternatively, one or more of the components of the device 110, the system 120, and/or a skill 125 may utilize the I/O interfaces (802/902), processor(s) (804/904), memory (806/906), and/or storage (808/908) of the device(s) 110, system 120, or the skill 125, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system 120, and a skill 125, as described herein, are illustrative, and may be located as a stand-alone device or may be included, in whole or in part, as a component of a larger device or system.

As illustrated in FIG. 10, multiple devices (110a-110j, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech controllable device 110a, a smart phone 110b, a smart watch 110c, a tablet computer 110d, a vehicle 110e, a speech-controlled device 110f with a display, a smart television 110g, a washer/dryer 110h, a refrigerator 110i, and/or a microwave 110j may be connected to the network(s) 199 through a wireless service provider, over a WiFi or cellular network connection, or the like. Other devices are included as network-connected support devices, such as the system 120, the skill(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of the system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving, from a skill component, a first message including a first action and a first payload, the first message being sent in response to a first input received by a speech processing system;
   determining, using definition data associated with a first cross functionality component, that the first cross functionality component is to execute prior to determining a device directive, wherein the first cross functionality component is configured to determine a target device to present first output data included in the first payload;

receiving, from the first cross functionality component, a first device identifier associated with a first device to be used to present the first output data;

determining, using a second cross functionality component and the first device identifier, a first device directive corresponding to the first message, the first device directive including the first device identifier, the first output data and first data indicative of a first device component of the first device to be operated to present the first output data, wherein the second cross functionality component is configured to determine device directives based on skill-generated messages and the target device; and causing a third cross functionality component to send the first device directive to the first device, receipt of the first device directive causing the first device to execute the first device component to present the first output data.

2. The computer-implemented method of claim 1, further comprising:

receiving a second message including a second action and a second payload;

in response to receiving the second message, determining that a fourth cross functionality component is to execute, the fourth cross functionality component configured to determine device resources in use;

determining, by the fourth cross functionality component, second data indicative of the first device component of the first device is in use;

determining, using the definition data, that the first cross functionality component is to execute prior to determining a device directive;

receiving, from the first cross functionality component, a second device identifier associated with a second device to be used to present second output data included in the second payload;

determining, using the second cross functionality component and the second device identifier, a second device directive including the second device identifier, the second output data, and third data indicative of a second device component of the second device to be operated to present the second output data; and causing the third cross functionality component to send the second device directive to the second device, receipt of the second device directive causing the second device to execute the second device component to present the second output data.

3. The computer-implemented method of claim 1, further comprising:

receiving, from the skill component, a second message including a second action and a second payload, the second message being sent in response to receiving the first input;

determining, using the second cross functionality component and the first device identifier, a second device directive corresponding to the second message, the second device directive including the first device identifier, second output data included in the second payload, and second data indicative of a second device component of the first device to be used to present the second output data;

determining, using a fifth cross functionality component, a directive queue indicating that the second device directive to be sent before the first device directive, wherein the fifth cross functionality component is configured to determine a queue for when multiple device directives are to be sent; and based on the directive queue, causing the third cross functionality component to send the second device directive to the first device prior to sending the first device directive.

4. A computer-implemented method comprising:

receiving, from a first component, a first message including a first action and a first payload;

in response to receiving the first message, determining that a first cross functionality component is to execute, wherein the first cross functionality component is configured to determine a target device to perform the first action;

receiving, from the first cross functionality component, first data indicative of a first device to present first output data included in the first payload;

determining a first device directive corresponding to the first message and the first device, the first device directive including the first data, the first output data, and a first device component to be operated to perform the first action; and sending, to the first device, the first device directive to cause the first device to present at least a portion of the first output data using the first device component.

5. The computer-implemented method of claim 4, further comprising:

receiving, from the first component, a second message including a second action and a second payload;

in response to receiving the second message, determining that the first cross functionality component is to execute prior to determining a device directive;

receiving, from the first cross functionality component, second data indicative of a second device to present second output data including in the second payload;

determining a second device directive corresponding to the second message and the second device, the second device directive including the second data, the second output data and a second device component to be operated to present the second output data; and sending, to the second device, the second device directive to cause the second device to present at least a portion of the second output data.

6. The computer-implemented method of claim 4, further comprising:

receiving, from a second component, a second message including a second action and a second payload;

in response to receiving the second message, determining that the first cross functionality component is to execute prior to determining a device directive;

receiving, from the first cross functionality component, second data indicative of a second device to present second output data included in the second payload;

determining a second device directive corresponding to the second message and the second device, the second device directive including the second data, the second output data and a second device component to be operated to present the second output data; and sending, to the second device, the second device directive to cause the second device to present at least a portion of the second output data.

7. The computer-implemented method of claim 4, further comprising:
  determining that a second cross functionality component is to execute after the first device directive is sent to the first device; and
  determining, using the second cross functionality component and the first data, second data corresponding to the first device directive.

8. The computer-implemented method of claim 4, further comprising:
  determining that a second cross functionality component is to execute;
  determining that the second cross functionality component is capable of executing in parallel with the first cross functionality component; and
  determining, using the second cross functionality component, second data corresponding to the first message, the second data being determined while the first data is being determined.

9. The computer-implemented method of claim 4, further comprising:
  determining that a second cross functionality component is to execute in response to receiving the first message including the first action;
  sending at least the first data to the second cross functionality component; and
  receiving, from the second cross functionality component, second data corresponding to the first message.

10. The computer-implemented method of claim 4, further comprising:
  determining that a second cross functionality component is to execute after the first device directive is generated; and
  determining, using the second cross functionality component, second data after the first device directive is determined and before sending the first device directive.

11. The computer-implemented method of claim 4, further comprising:
  determining that a second cross functionality component is to execute before the first data is determined; and
  determining, using the second cross functionality component, second data before determining the first data.

12. The computer-implemented method of claim 4, further comprising:
  determining, using a second cross functionality component, a second device directive corresponding to the first message and the first device, wherein the second cross functionality component is configured to determine device facing directives based at least in part on system-generated messages and a target device;
  determining a directive queue indicating the second device directive to be sent before the first device directive; and
  sending, using a third cross functionality component and based on the directive queue, the second device directive to the first device prior to sending the first device directive, wherein the third cross functionality component is configured to send directives to a device.

13. A computing system comprising:
  at least one processor; and
  at least one memory comprising instructions that, when executed by the at least one processor, cause the computing system to:
    receive, from a first component, a first message including a first action and a first payload;
    in response to receiving the first message, determine that a first cross functionality component is to execute, wherein the first cross functionality component is configured to determine a target device to perform the first action;
    receive, from the first cross functionality component, first data indicative of a first device to present first output data included in the first payload;
    determine a first device directive corresponding to the first message and the first device, the first device directive including the first data, the first output data, and a first device component to be operated to perform the first action; and
    send, to the first device, the first device directive to cause the first device to present at least a portion of the first output data using the first device component.

14. The computing system of claim 13, wherein the at least one memory further comprises instructions that, when executed by the at least one processor, further cause the computing system to:
  receive, from the first component, a second message including a second action and a second payload;
  in response to receiving the second message, determine that the first cross functionality component is to execute prior to determining a device directive;
  receive, from the first cross functionality component, second data indicative of a second device to present second output data including in the second payload;
  determine a second device directive corresponding to the second message and the second device, the second device directive including the second data, the second output data and a second device component to be operated to present the second output data; and
  send, to the second device, the second device directive to cause the second device to present at least a portion of the second output data.

15. The computing system of claim 13, wherein the at least one memory further comprises instructions that, when executed by the at least one processor, further cause the computing system to:
  receive, from a second component, a second message including a second action and a second payload;
  in response to receiving the second message, determine that the first cross functionality component is to execute prior to determining a device directive;
  receive, from the first cross functionality component, second data indicative of a second device to present second output data included in the second payload;
  determine a second device directive corresponding to the second message and the second device, the second device directive including the second data, the second output data and a second device component to be operated to present the second output data; and
  send, to the second device, the second device directive to cause the second device to present at least a portion of the second output data.

16. The computing system of claim 13, wherein the at least one memory further comprises instructions that, when executed by the at least one processor, further cause the computing system to:
  determine that a second cross functionality component is to execute after the first device directive is sent to the first device; and
  determine, using the second cross functionality component and the first data, second data corresponding to the first device directive.

17. The computing system of claim 13, wherein the at least one memory further comprises instructions that, when executed by the at least one processor, further cause the computing system to:
  determine that a second cross functionality component is to execute;
  determine that the second cross functionality component is capable of executing in parallel with the first cross functionality component; and
  determine, using the second cross functionality component, second data corresponding to the first message, the second data being determined while the first data is being determined.

18. The computing system of claim 13, wherein the at least one memory further comprises instructions that, when executed by the at least one processor, further cause the computing system to:
  determine that a second cross functionality component is to execute in response to receiving the first message including the first action;
  send at least the first data to the second cross functionality component; and
  receive, from the second cross functionality component, second data corresponding to the first message.

19. The computing system of claim 13, wherein the at least one memory further comprises instructions that, when executed by the at least one processor, further cause the computing system to:
  determine that a second cross functionality component is to execute after the first device directive is generated; and
  determine, using the second cross functionality component, second data after the first device directive is determined and before sending the first device directive.

20. The computing system of claim 13, wherein the at least one memory further comprises instructions that, when executed by the at least one processor, further cause the computing system to:
  determine that a second cross functionality component is to execute before the first data is determined; and
  determine, using the second cross functionality component, second data before determining the first data.

* * * * *